US012152409B2

(12) United States Patent
Zhang et al.

(10) Patent No.: US 12,152,409 B2
(45) Date of Patent: Nov. 26, 2024

(54) ELECTRONIC MORTISE LOCK CYLINDER

(71) Applicant: Digilock Asia Ltd., Lai Chi Kok (HK)

(72) Inventors: An Zhang, Shaoguan (CN); Asil Gokcebay, Petaluma, CA (US)

(73) Assignee: Security People, Inc., Houston, TX (US)

( * ) Notice: Subject to any disclaimer, the term of this patent is extended or adjusted under 35 U.S.C. 154(b) by 0 days.

(21) Appl. No.: 17/721,977

(22) Filed: Apr. 15, 2022

(65) Prior Publication Data

US 2023/0332435 A1 Oct. 19, 2023

(51) Int. Cl.

*E05B 47/00* (2006.01)
*E05B 9/08* (2006.01)
*E05B 41/00* (2006.01)
*E05B 63/04* (2006.01)
(Continued)

(52) U.S. Cl.

CPC .......... *E05B 47/0012* (2013.01); *E05B 63/08* (2013.01); *G07C 9/00571* (2013.01); *E05B 9/084* (2013.01); *E05B 41/00* (2013.01); *E05B 2047/0017* (2013.01); *E05B 2047/002* (2013.01); *E05B 2047/0026* (2013.01);
(Continued)

(58) Field of Classification Search

CPC ..... E05B 2047/0017; E05B 2047/0018; E05B 2047/002; E05B 2047/0024; E05B 2047/0025; E05B 2047/0026; E05B 2047/0067; E05B 2047/0069; E05B 2047/0072; E05B 2047/0094; E05B 2047/0095; E05B 2047/0058; E05B 2047/0091; E05B 17/0054; E05B 17/0058; E05B 17/044; E05B 17/045; E05B 15/0013; E05B 47/0012; E05B 63/08; E05B 63/04; E05B 9/084; E05B 9/002; E05B 9/04; E05B 41/00; G07C 9/00571; Y10S 292/53; Y10S 292/11; Y10T 292/91

See application file for complete search history.

(56) References Cited

U.S. PATENT DOCUMENTS

| | | | |
|---|---|---|---|
| 3,748,878 | A | 7/1973 | Balzano et al. |
| 5,010,750 | A | 4/1991 | Boser et al. |
| 5,228,730 | A | 7/1993 | Gokcebay et al. |

(Continued)

FOREIGN PATENT DOCUMENTS

| | | | |
|---|---|---|---|
| AU | 2010219422 A1 | | 4/2011 |
| AU | 2019232902 A1 | * | 4/2020 |

(Continued)

*Primary Examiner* — Christine M Mills
*Assistant Examiner* — Yahya Sidky

(57) ABSTRACT

A lock and method for locking including an electronic cylinder assembly that may be a direct replacement for a standard cylinder in a standard mortise type door lock housing. The cylinder assembly may include a first shaft rotatably mounted in the core and a second shaft rotatably mounted in the core and coaxial with the first shaft. A clutch is disposed on the first shaft and rotationally fixed to the first shaft but axially shiftable. The cylinder assembly also includes a slider with a finger, where the finger is engaged with the clutch, and a motor is configured to shift the slider axially between a first position and a second position. In the first position, the clutch is disengaged from the second shaft, and in the second position, the clutch is engaged with the second shaft, such that rotation of the first shaft causes rotation of the second shaft.

23 Claims, 50 Drawing Sheets

(51) Int. Cl.
*E05B 63/08* (2006.01)
*G07C 9/00* (2020.01)

(52) U.S. Cl.
CPC ................. *E05B 2047/0058* (2013.01); *E05B 2047/0091* (2013.01); *E05B 63/04* (2013.01)

(56) References Cited

U.S. PATENT DOCUMENTS

| | | | |
|---|---|---|---|
| 5,245,329 A | 9/1993 | Gokcebay | |
| 5,337,043 A | 8/1994 | Gokcebay | |
| 5,367,295 A | 11/1994 | Gokcebay et al. | |
| 5,552,777 A | 9/1996 | Gokcebay et al. | |
| 6,000,609 A | 12/1999 | Gokcebay et al. | |
| 6,374,653 B1 | 4/2002 | Gokcebay et al. | |
| 6,552,650 B1 | 4/2003 | Gokcebay et al. | |
| 6,826,935 B2 | 12/2004 | Gokcebay et al. | |
| 6,865,916 B2 | 3/2005 | Goldman | |
| 6,927,670 B1 | 8/2005 | Gokcebay et al. | |
| 7,275,402 B2 | 10/2007 | Lüling et al. | |
| 7,334,443 B2 * | 2/2008 | Meekma | E05B 47/0673 70/276 |
| 7,397,343 B1 | 7/2008 | Gokcebay et al. | |
| 7,591,160 B2 | 9/2009 | Keller | |
| 7,845,202 B2 | 12/2010 | Padilla et al. | |
| 7,874,190 B2 | 1/2011 | Krisch et al. | |
| 7,966,854 B2 | 6/2011 | Imedio Ocaña | |
| 8,028,553 B2 | 10/2011 | Lange | |
| 8,028,554 B2 | 10/2011 | Amir | |
| 8,459,071 B2 | 6/2013 | Andersson | |
| 8,516,865 B2 | 8/2013 | Ferreira Sánchez | |
| 8,534,102 B2 | 9/2013 | Andersson | |
| 8,544,302 B2 | 10/2013 | Goldman | |
| 8,683,833 B2 | 4/2014 | Marschalek et al. | |
| 8,689,594 B2 | 4/2014 | Yanar et al. | |
| 9,051,761 B2 | 6/2015 | Romero | |
| 9,222,281 B2 | 12/2015 | Fowler et al. | |
| 9,303,433 B2 | 4/2016 | Chiou et al. | |
| 9,340,999 B2 * | 5/2016 | Romero | E05B 47/06 |
| 9,920,551 B2 | 3/2018 | Field | |
| 10,125,519 B1 | 11/2018 | Gengler et al. | |
| 10,145,147 B2 | 12/2018 | Ferreira et al. | |
| 10,253,526 B2 | 4/2019 | Trent et al. | |
| 10,689,881 B2 * | 6/2020 | Wolfish | E05B 55/005 |
| 2002/0101083 A1 | 8/2002 | Toledano et al. | |
| 2008/0072636 A1 | 3/2008 | Padilla et al. | |
| 2010/0011822 A1 * | 1/2010 | Imedio | E05B 47/0615 70/278.7 |
| 2010/0154494 A1 | 6/2010 | Sakai et al. | |
| 2010/0180651 A1 | 7/2010 | Andersson | |
| 2015/0159402 A1 | 6/2015 | Yahav | |
| 2016/0258189 A1 | 9/2016 | Frolov | |
| 2019/0218826 A1 | 7/2019 | Allen et al. | |
| 2020/0270904 A1 | 8/2020 | Lee et al. | |
| 2021/0222462 A1 | 7/2021 | Chen | |
| 2021/0301558 A1 | 9/2021 | Lee et al. | |

FOREIGN PATENT DOCUMENTS

| | | | | |
|---|---|---|---|---|
| CN | 101413366 B | | 9/2012 | |
| CN | 104533139 A | | 4/2015 | |
| CN | 103470107 B | | 7/2015 | |
| CN | 103422735 B | | 5/2016 | |
| CN | 106223729 A | | 12/2016 | |
| CN | 208587028 U | | 3/2019 | |
| CN | 208587029 U | | 3/2019 | |
| CN | 109681038 A | | 4/2019 | |
| CN | 113236044 | * | 8/2021 | |
| CN | 113338713 A | | 9/2021 | |
| DE | 19822865 A1 | | 11/1999 | |
| DE | 102004047980 | | 3/2006 | |
| DE | 102006001266 | | 5/2007 | |
| EP | 0303849 A1 | | 2/1989 | |
| EP | 0324096 A2 | | 7/1989 | |
| EP | 0526904 A1 | | 2/1993 | |
| EP | 0995864 A2 | | 4/2000 | |
| EP | 1065335 A1 | | 1/2001 | |
| EP | 1323880 A2 | | 7/2003 | |
| EP | 1022415 B1 | | 3/2005 | |
| EP | 1626142 A2 | | 2/2006 | |
| EP | 1795675 A2 | | 6/2007 | |
| EP | 2400085 A2 | | 12/2011 | |
| EP | 2436858 A2 | | 4/2012 | |
| EP | 2453083 A2 | | 5/2012 | |
| EP | 2628876 A2 | | 8/2013 | |
| EP | 2665045 B1 | | 10/2019 | |
| EP | 3271532 B1 | | 5/2020 | |
| EP | 3985212 A1 | | 4/2022 | |
| GB | 2281938 A | | 3/1995 | |
| NL | 1039122 C2 | | 1/2013 | |
| SI | 24207 A | | 4/2014 | |
| SI | 24930 A | | 8/2016 | |
| WO | 2005093191 A1 | | 10/2005 | |
| WO | 2011102745 A1 | | 8/2011 | |
| WO | 2012035526 A1 | | 3/2012 | |
| WO | WO-2017075447 A1 | * | 5/2017 | E05B 17/0075 |

* cited by examiner

ELECTRONIC MORTISE LOCK CYLINDER

FIELD OF THE DISCLOSURE

The present disclosure relates generally to an electronically operated mortise or rim cylinder lock for a door lock.

BACKGROUND

Mechanical key-actuated locks in mortise or rim cylinder door locks are common in commercial and residential applications. The lock cylinders can easily be attached in and out of the lock housing or the door.

As consumers and users have become comfortable with electronically operated locks, they have begun considering replacing these mechanical locks with electronic locks. While electronic locks have numerous advantages, including ease of use and internet connectivity, over conventional mechanical ones, existing electronic locks have certain issues. For example, existing electronic locks may be difficult or expensive to install as a retrofit into existing doors, or may require hard wiring. Moreover, some existing electronic lock cylinders only provide access in a time-based manner. Once the user enters the credential, the lock unlocks for a certain period of time, then automatically re-locks. If the user cannot open the door in time, he or she must re-enter the credential.

There remains a need in the art to retrofit existing mechanical locks with electronic cylinders, including mortise or rim cylinders, to convert them for electronic use.

DETAILED DESCRIPTION

Figure 1:
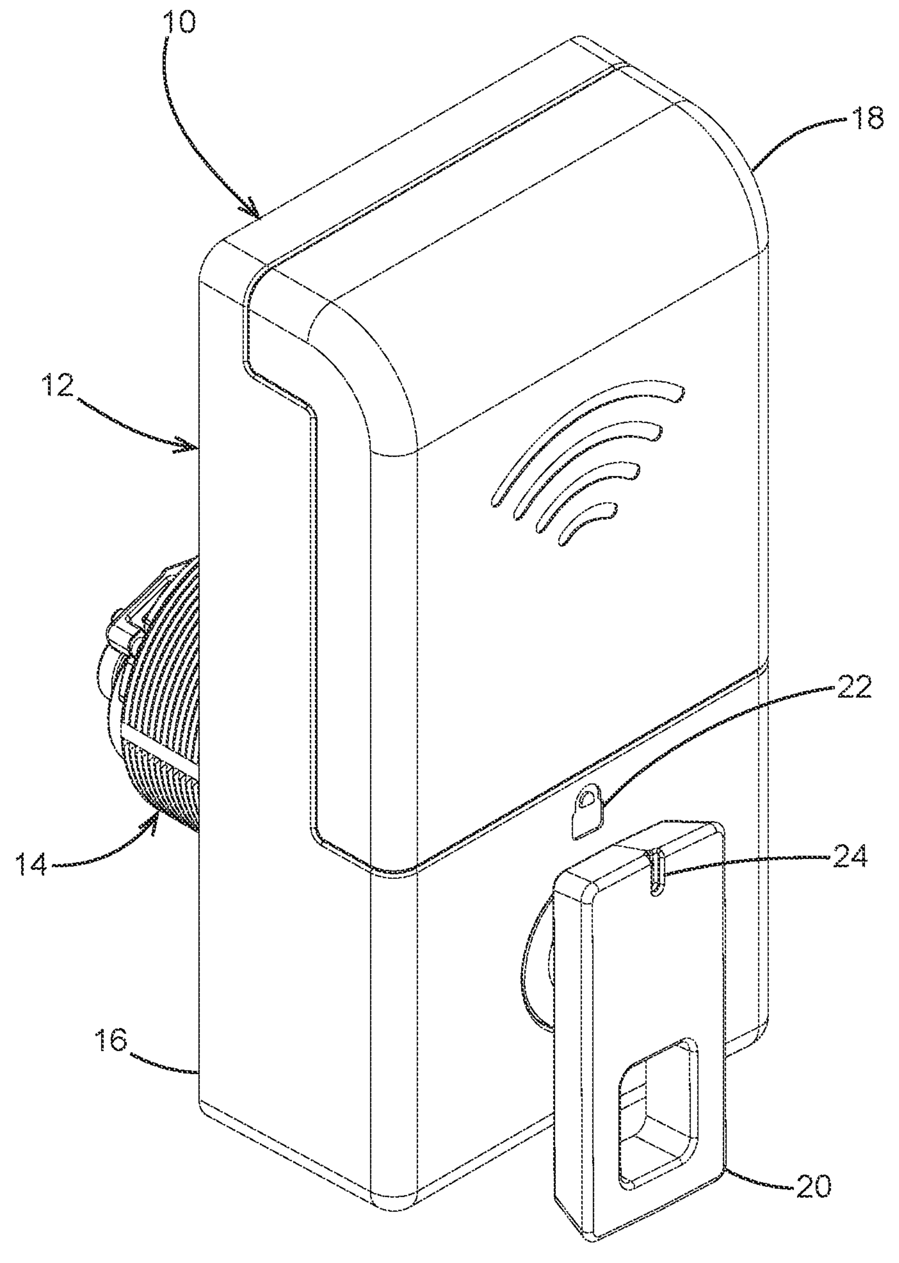
FIG. 1 is a perspective view of a lock cylinder assembly with an electronically-operated mortise cylinder having two cams.
Figure 2:
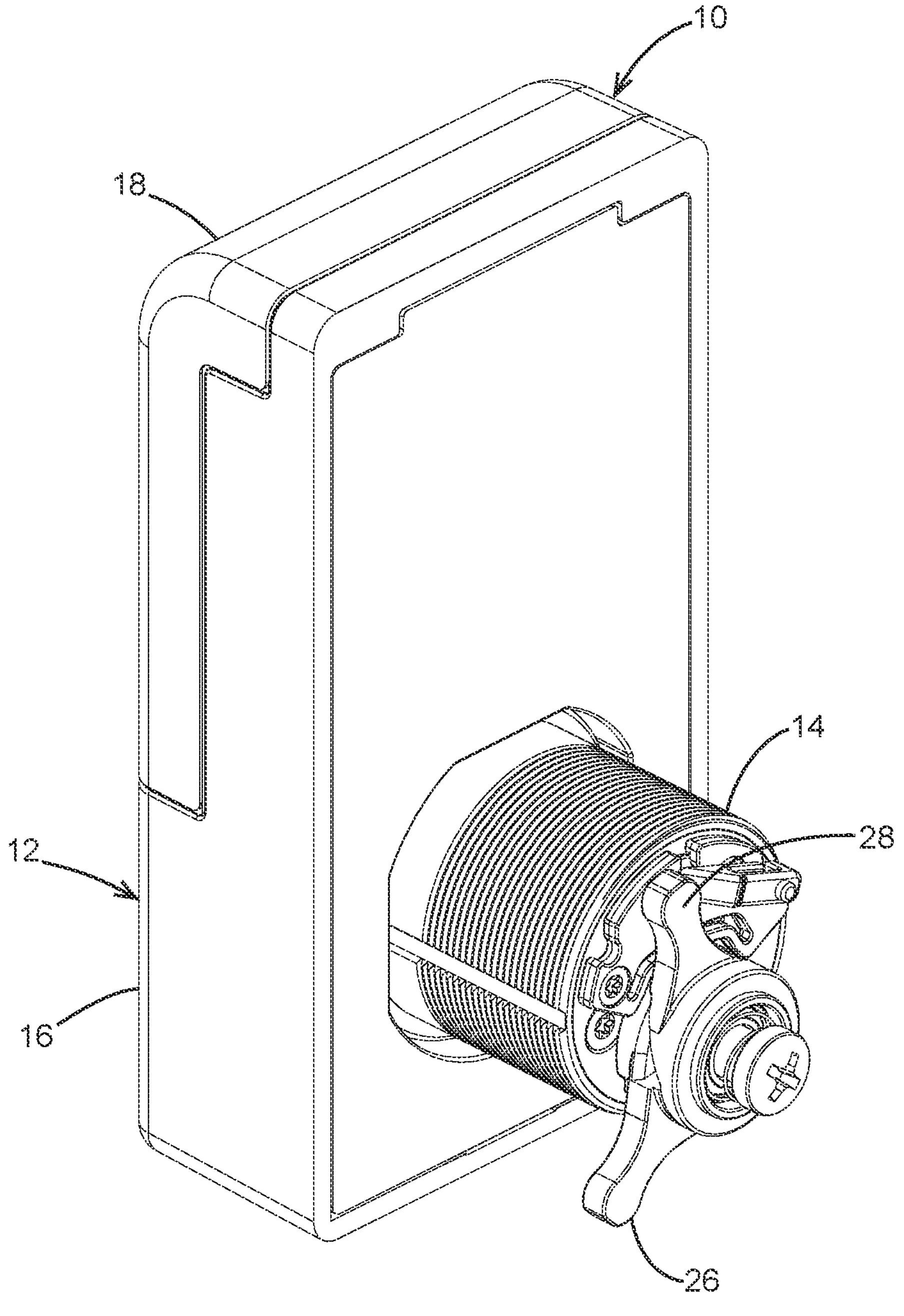
FIG. 2 is a second perspective view of the lock cylinder assembly of FIG. 1, with the assembly rotated 180 degrees.
Figure 3:
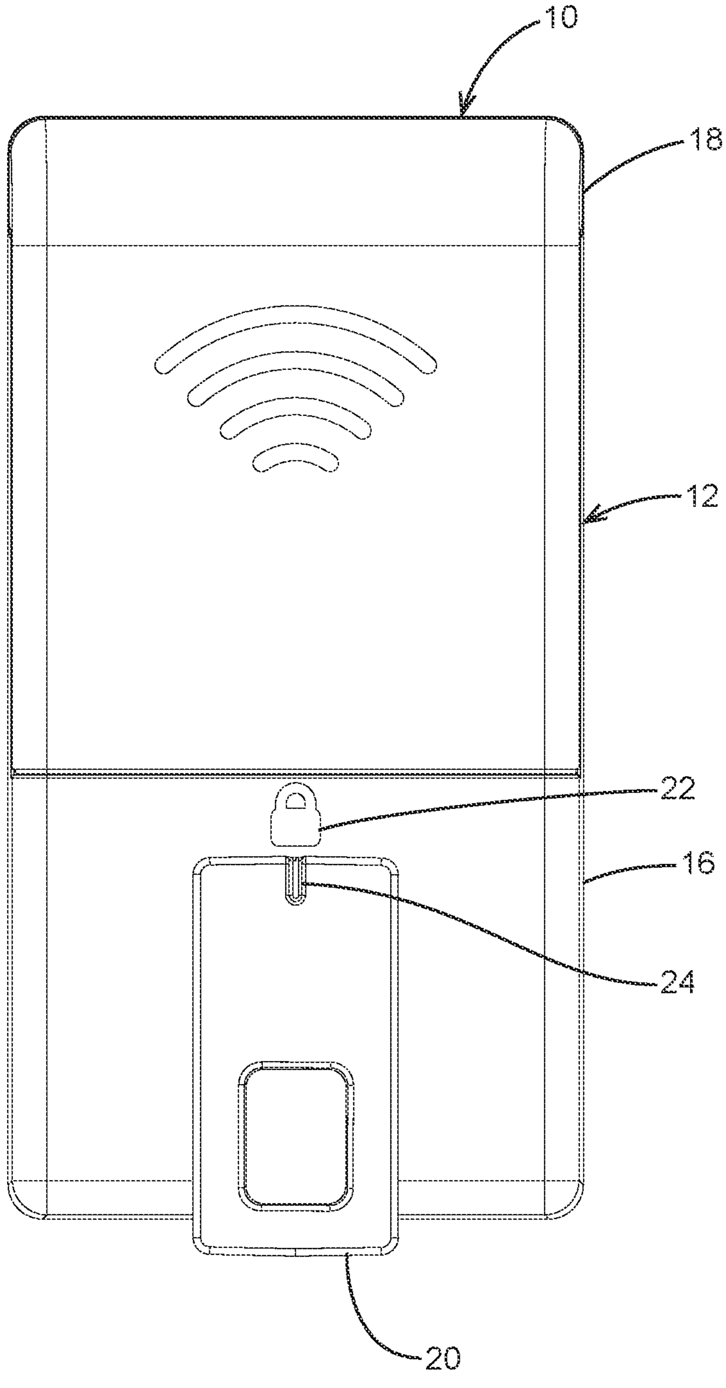
FIG. 3 is a front view of the lock cylinder assembly of FIG. 1.

Referring to FIGS. 1, 2, and 3, an electronically operated lock cylinder assembly 10 useful in a mortise-type door lock is shown. The lock cylinder assembly 10 can replace an existing standard cylinder in a mortise lock to convert the lock from a manual key-operated lock to a lock that can be operated electronically by RFID, NFC, Bluetooth, BLE, keypad, or other electronic credential. It can further be connected wirelessly to the internet or an intranet to be accessed remotely via, e.g., a personal computer, cell phone, or tablet. In another aspect, the lock cylinder assembly 10 includes structure that, in less than a full rotation of the cylinder, will retract both the deadbolt and the spring-loaded door latch of a standard mortise lock to allow the door to be opened. In another aspect, the lock cylinder assembly 10 can be configured to be operable for either left hand or right hand operation, depending on the door to which it is mounted. While this disclosure discusses and depicts a mortise cylinder, the teachings of this disclosure may also apply to other types of cylinder locks, such as rim cylinders, as will be apparent to those of skill in the art.

The lock cylinder assembly 10 includes a control assembly 12 and an electronic cylinder assembly 14. The control assembly 12 includes a control housing 16, a cover 18, and a rotatable knob 20. The control housing 16 includes a locked indicator 22. The knob 20 includes an indicator notch 24. The cylinder assembly 14 includes a first cam 26 and a second cam 28. As will be described more fully herein, when lock cylinder assembly 10 receives a predetermined electronic credential, the lock cylinder assembly 10 will unlock the cylinder assembly 14. When the user rotates the knob 20 and rotates the notch 28 away from the locked indicator 22, and the first cam 26 operates to retract the deadbolt into the mortise lock. When the user rotates the knob 24 further, the second cam 28 operates to retract the door latch, and the user may open the door. In one embodiment, the indicator 22 is integral with—and may be molded into—the control housing 16. The indicator 22 can, in other embodiments, be a window in the control housing 16 and include an LED directly behind that can provide further visual feedback to the user regarding the status of the lock assembly 10. For example, the LED of the indicator 22 can be green when the lock cylinder assembly 10 is unlocked, and red when the lock cylinder assembly 10 is locked. As will be understood, the housing 12 can incorporate an LED separate from or in addition to the indicator 22.

In one embodiment, the lock cylinder assembly 10 can remain unlocked until the user inputs the credential again to re-lock it. In this manner, the lock cylinder assembly 10 stays unlocked until the user desires the assembly 10 to be locked again, and behaves in a manner similar to a mechanical lock as a user is well aware. It is also possible for the lock cylinder assembly 10 to be configured to automatically re-lock after a certain amount of time.

Figure 1A:
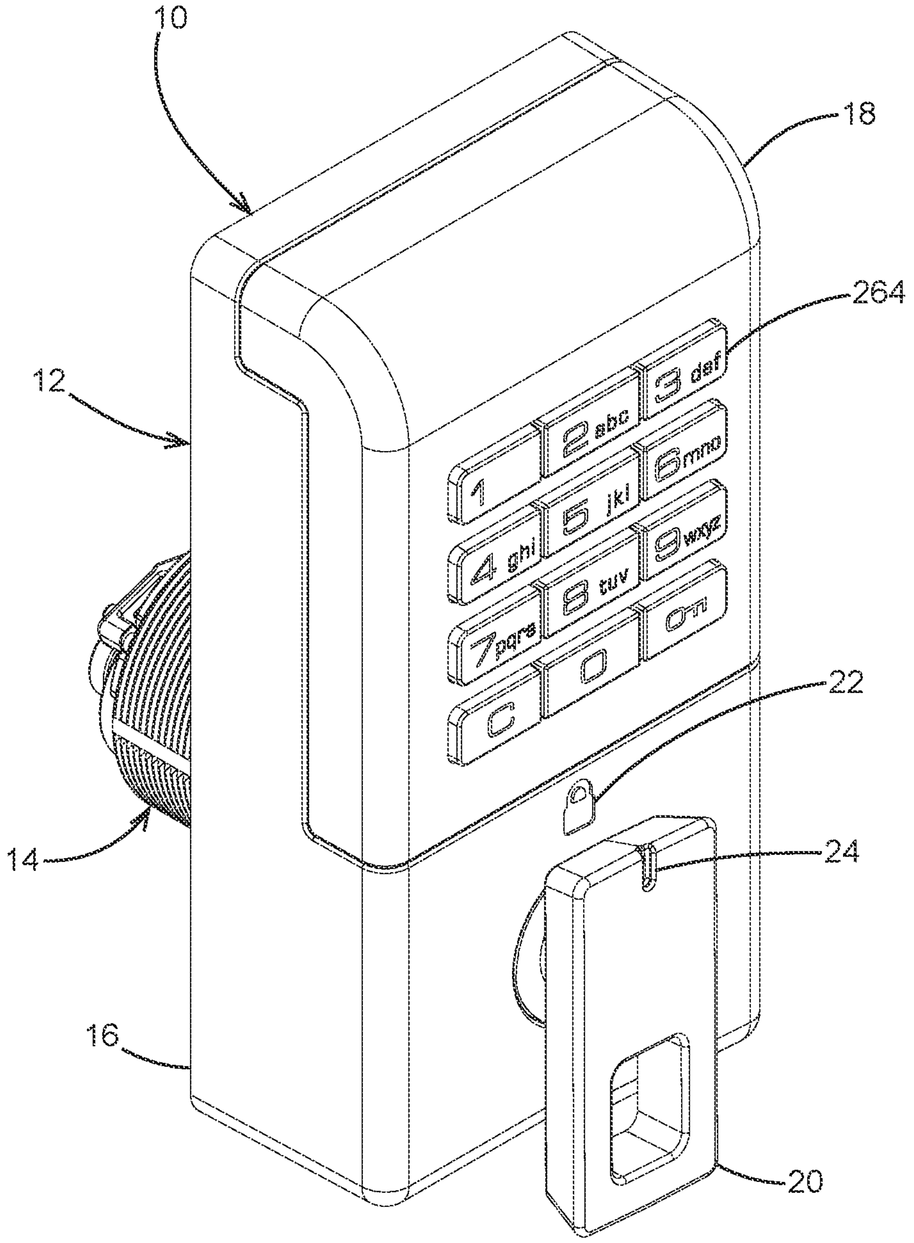
FIG. 1*a* is a perspective view of the lock of FIG. 1 with an alternative keypad input.
Figure 2A:
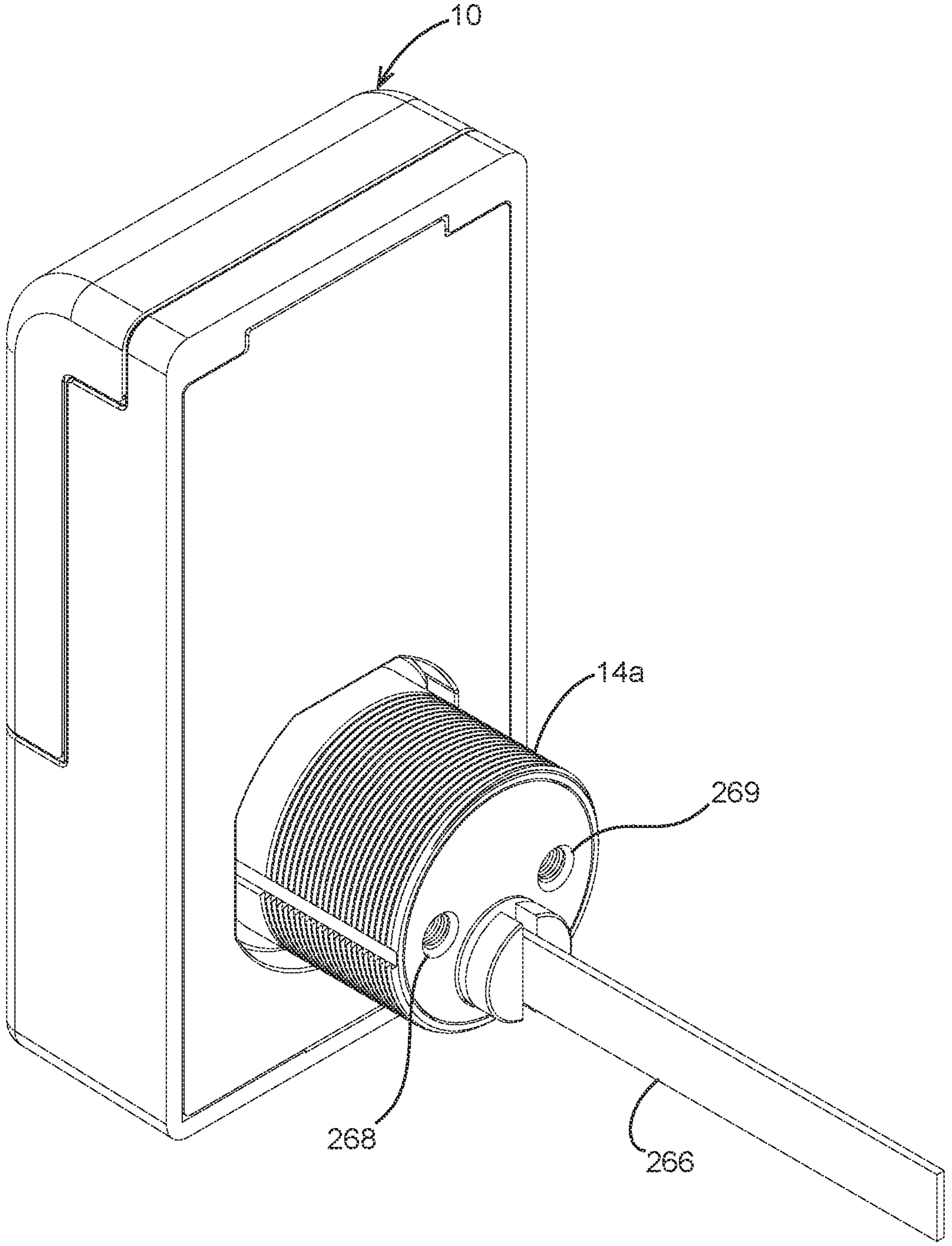
FIG. 2*a* is a perspective view of an alternative embodiment incorporating an electronically operated rim cylinder with a tailpiece.
Figure 2B:
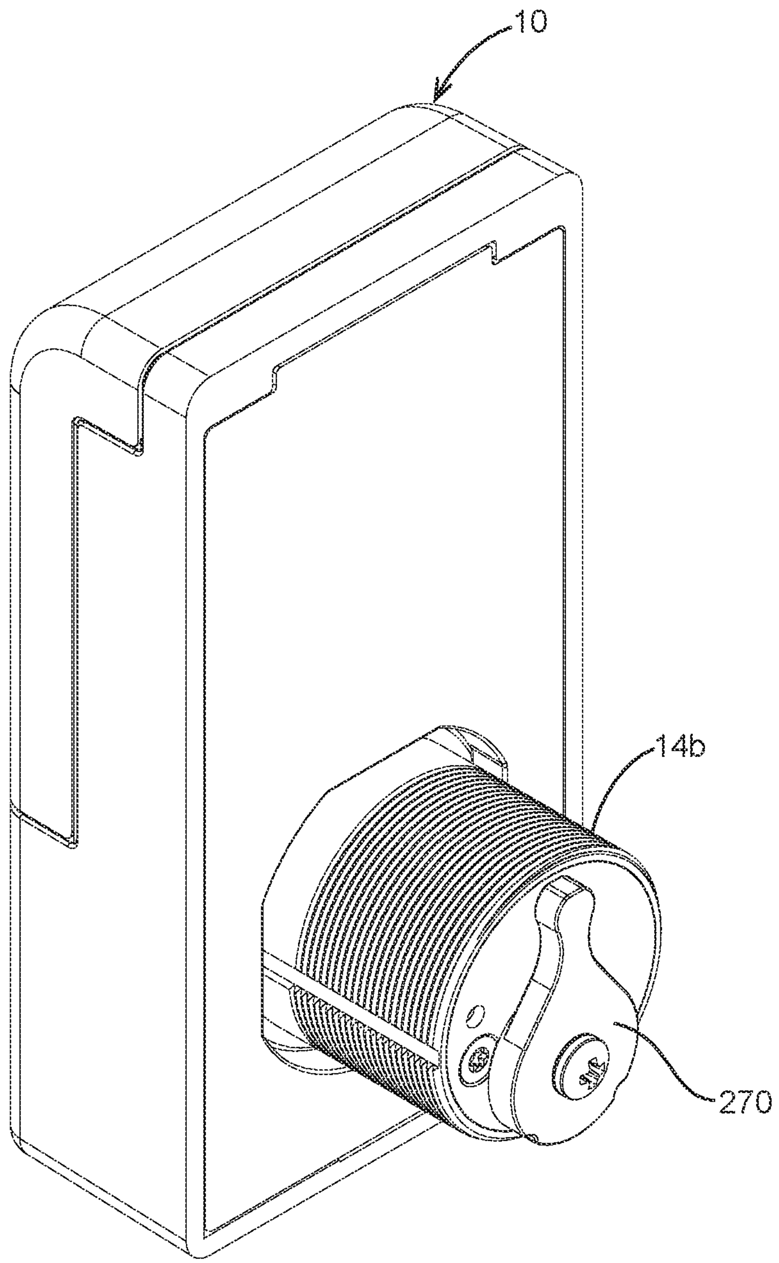
FIG. 2*b* is a perspective view of an alternative embodiment incorporating an electronically-operated mortise cylinder with a single cam.

An alternative lock cylinder assembly 10 with a keypad input 264 is depicted in FIG. 1*a*. Moreover, alternative cylinder assemblies 14*a* and 14*b* are depicted in FIGS. 2*a* and 2*b*. Cylinder assembly 14*a* is a rim cylinder with a tailpiece 266 and two internally threaded mounting holes 268, 269 that operate in known fashion. Cylinder assembly 14*b* has a single cam 270. In certain embodiments, the mortise housing includes only a latch and not a bolt. In these embodiments, only a single cam 270 is needed to operate the door latch.

Figure 4:
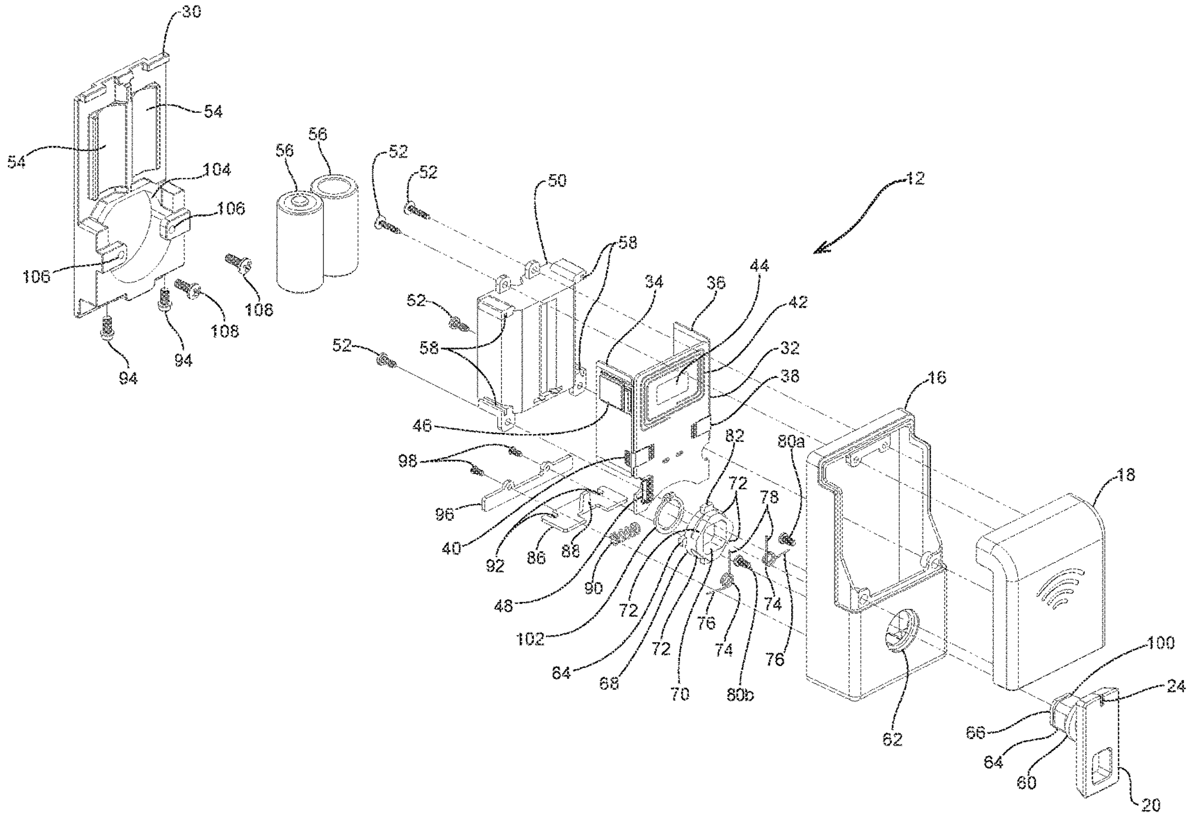
FIG. 4 is an exploded view of a control assembly of the lock cylinder assembly of FIG. 1.

Referring now to FIG. 4, an exploded view of the control assembly 12 is shown. The exterior of the control assembly 12 generally includes the control housing 16, the cover 18, and a back plate 30. The control assembly 12 incorporates the components to connect wirelessly to the user and to the internet, or lock controllers that act as an intermediate between the lock and the internet. This includes a front circuit board 32, a left circuit board 34, and a right circuit board 36. The circuit boards 32, 34, 36 are connected to each other for power and data via connectors 38 and 40. An RFID antenna 42 and a capacitive sensor 44 are disposed on the front circuit board 32. A Bluetooth antenna 46 is disposed in this example on the left circuit board 34. The front circuit board 32 also includes a connector 48 which is in communication with all of the components on the front, left, and right circuit boards 32, 34, 36, and is used for connecting these components with the electronics housed within the cylinder assembly 14. While in this example, three separate boards are used, in other embodiments with smaller components, a single board could be used, and all components could be mounted to the same board. Multiple boards have the advantage, however, of isolating the antennas from the other component to reduce interference, which is known in the art by one of ordinary skill. The multiple boards may be stacked, perpendicular, or otherwise oriented relative to each other.

The control assembly 12 further includes a battery housing 50 that is affixed to the control housing 16 and cover 18 via four screws 52. The back plate 30 includes cradles 54 for locating two batteries 56. The batteries 56 can provide power to the lock cylinder assembly 10 in known manner. The battery housing 50 further supports the left and right circuit boards 34, 36 by mounting them in slots 58 within the battery housing.

The knob 20 includes an abutment 60, and the control housing 16 includes a circular seat 62 sized and shaped to receive the abutment 60. The abutment 60 is rotatably disposed in the seat 62, but it is prevented from moving axially in the direction of the control housing 16 by the seat 62. The knob 20 further includes a drive shaft 64 that is generally square in cross-section, although in the current version, the edges are beveled. As will be described further below, the drive shaft 64 includes an axial recess (not shown) on its end face 66.

A positioning piece 68 has an internal through-hole 70 shaped to be placed over the drive shaft 64 such that rotation of the knob 20 causes corresponding rotation of the positioning piece 68. The positioning piece 68 includes four positioning faces 72 forming generally a cross-sectional square shape, and a pair of positioning springs 74 are disposed adjacently in the control housing 16. The positioning springs 74 are anchored on their outside legs 76 and the inner legs 78 are biased against the positioning faces 72 of the positioning piece 68. Accordingly, the positioning springs 74 are biased to maintain the positioning piece 68 in a rotational position where inner legs 78 are aligned with and bear against the positioning faces 72. The positioning faces 72 are configured such that the positioning springs 74 bias the knob 20 in at least the locked cylinder position.

The lock cylinder assembly 10 also includes structure that prevents over rotation of the knob 20. Depending on the orientation of the lock, whether right-handed (i.e., clockwise rotation of the knob 20 causes withdrawal of the bolt) or left-handed (counterclockwise rotation for unlocking), one of two screws 80*a* and 80*b*, both of which are shown, will be inserted into the back side of the control housing 16. The positioning piece 16 includes a first set of tabs 82. In this example, if screw 80*a* is used, when the user rotates the knob 80 clockwise, the screw 80*a* will block rotation more than a quarter turn when the tab 82 contacts the screw 80*a*. In this example, the second screw 80*b* is not used and thus does not prevent counterclockwise rotation.

The positioning piece 68 further includes a second set of tabs 84 that are useful in mounting the control housing 16 to the back plate 30. A sliding access plate 86 is slidably mounted in the control housing 16 and can translate left and right. The access plate 86 includes an upstanding pin 88 that interacts with one of the second set of tabs 84 to slide the plate against the bias of a spring 90 upon rotation of the knob 20. As will be described more fully later, the access plate 86 includes two recesses 92 that, when the knob 20 is fully rotated to the door unlatched position, align with two mounting screws 94 of the back plate 30. The access plate 86 is maintained in a slot of the control housing 16 by plate 96 and two screws 98.

The drive shaft 64 further includes a circumferential recess 100, and a retaining ring 102 is disposed in the circumferential recess 100, thereby maintaining the positioning piece 68 on the drive shaft 64 and maintaining the knob 20 on the seat 62 of the control housing 16.

The back plate 30 further mounts to the cylinder assembly 14. The back plate 30 includes an opening 104 configured to receive the cylinder assembly 14. The back plate further includes two openings 106 on opposite sides in each which are disposed a screw 108. As will be seen, the screws 108 fasten the back plate 30 to the cylinder assembly 14.

Figure 5:
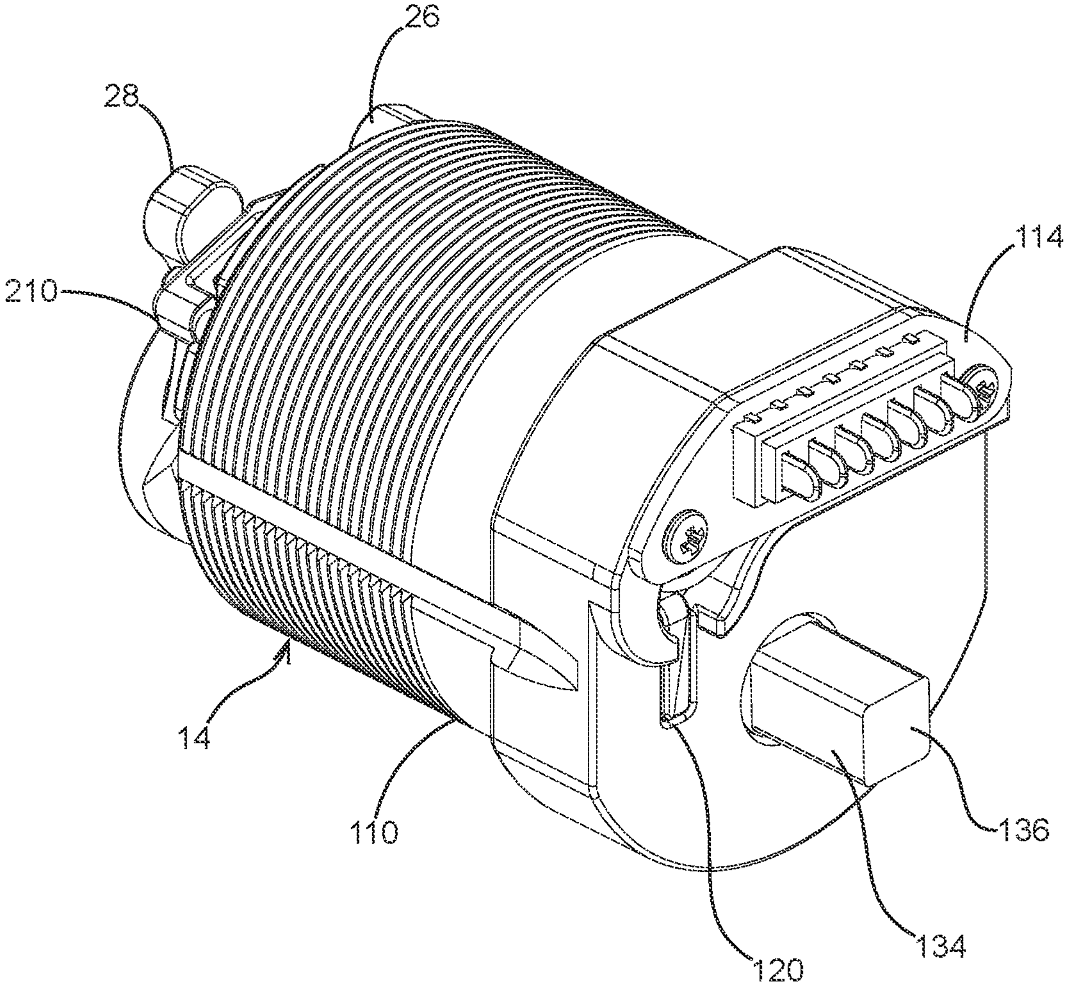
FIG. 5 is a detail perspective view of an electronic cylinder assembly the lock cylinder assembly of FIG. 1.
Figure 6:
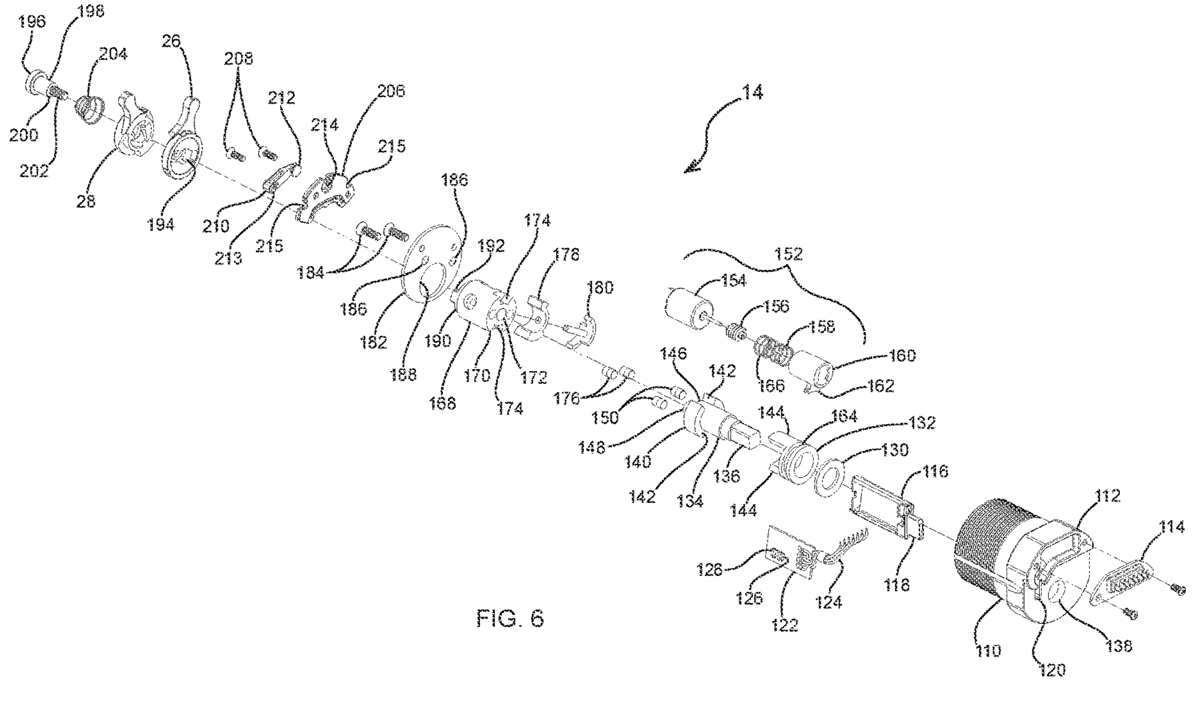
FIG. 6 is an exploded view of the cylinder assembly of FIG. 5.

Referring now to FIGS. 5 and 6, the cylinder assembly 14 includes a cylinder 110 that is threaded on its external surface and configured to be screwed into a standard mortise lock in known fashion.

The cylinder 110 includes a forward recess 112 to which a cylinder connector 114 is attached. The cylinder connector 114 is configured to be connected to the connector 48 disposed on the front circuit board 32 of the control housing 16. The recess 112 provides space for wiring to be connected to the back side of the cylinder connector 114.

A control board holder 116 is disposed within the cylinder 110 and includes a tab 118 that extends through an opening 120 in the cylinder 110. The tab 118 serves to mount and stabilize the control board holder 116 within the cylinder 110. A control circuit board 122 is mounted within the control board holder 116 and wiring 124 extends from the control circuit board 122 to the cylinder connector 114. A processor such as a microprocessor or microcontroller can be disposed on the board 122. Further disposed on the circuit board 122 and in communication with the processor are a first optical sensor 126 and a second optical sensor 128. As will be described further below, the optical sensors 16, 128 assist in determining the rotational position of the drive shaft 64.

Also disposed in the cylinder 110 is a bearing washer 130, a clutch 132, and a driven shaft 134. The driven shaft 134 includes a forward section 136 that is approximately square in cross section that extends through a hole 138 in the cylinder 110. The forward section 136 is sized and shaped to be inserted into the axial recess 66 of the drive shaft 64 of the knob 20 such that rotation of the knob 20 will rotate the driven shaft 134. The washer 130 is disposed on the driven shaft 134 within the cylinder 110 to protect the clutch 132 from frictional wear. The clutch 132 is further disposed on the driven shaft 134. The driven shaft 134 includes a circumferential ridge 140 with two slots 142, and the clutch 132 includes two fingers 144 that slide axially within the slots 142. The clutch 132, therefore, is axially translatable relative to the driven shaft 134, but is not rotatable relative to the driven shaft 134. Finally, the driven shaft 134 defines a rear face 146 and nub 148 extending out from the rear face 146. The driven shaft 134 further includes a pair of magnets 150 disposed therein that are coplanar with the rear face 146.

An actuator assembly 152 is further disposed within the cylinder 110 and is configured to drive the clutch 132 axially. The actuator assembly 152 includes an electric motor 154, a worm gear 156, a spring 158, and a slider 160. The slider 160 includes a finger 162 that engages a circumferential recess 164 in the clutch 132. The spring 158 is disposed inside the slider 160 and is affixed to the slider 160 on a front and rear end. In other words, the spring 158 cannot rotate relative to the slider 160. The worm gear 156 is disposed within the slider 160 as well. The spring 158 generally has a diameter greater than the diameter of the worm gear 156, but the spring also has a constricted portion 166 that has a narrower diameter that engages the teeth of the worm gear 156. Thus, rotation of the worm gear 156 translates the slider 160 axially. However, if the slider 160 is physically blocked from axial translation, the spring 158 allows the worm gear 156 to rotate and build up a spring force by translating the constricted portion 166 of the spring 158 along the worm gear 156 to create compressed and extended portions of the spring 158. Once the physical block is removed, the built-up force in the spring 158 will translate the slider 160. Axial movement of the slider 160 translates the clutch 132 axially. Other options are available to translate the slider 160, including electronic actuators, gearmotors, and the like.

Moving further down the axis, the cylinder 110 further includes a cam driver 168 with a front face 170 and a first recess 172 that receives the nub 148 of the driven shaft 134, such that driven shaft 134 can rotate coaxially with and relative to the cam driver 168. The cam driver 168 includes two finger recesses 174 sized and shaped to receive the fingers 144 of the clutch 132 when the finger recesses 174 and the fingers 144 are aligned. The cam driver 168 further includes two magnets 176 disposed therein. These magnets 176 are configured to attract the magnets 150 of the driven shaft 134 to bias the cam driver 168 rotationally and align the finger recesses 174 with the fingers 144. Other structure and methods of aligning the driven shaft 134 and the cam driver 168 can be employed, for example ball detents.

The cam driver 168 further includes a reflecting ring 178 and a shielding ring 180 mounted to a portion of its outer surface. The rings 178, 180 are configured such that in the different positions, the first sensor 126 and second sensor overlay different combinations of the shielding ring 178 and reflecting ring 180, thereby providing different signals based on the rotational position. In this manner, the optical sensors 126, 128 assist in communicating the rotational position of the cam driver 168 to the processor. Of course, the described layout is only one possibility, and as long as there are three different signals based on the position of the cam driver 168, any configuration is possible.

A cylinder back plate 182 is mounted to the back of the cylinder 110 via two screws 184 extending through throughholes 184 in the back plate 182 and into threaded openings in the cylinder 110. The back plate 182 maintains all of the above described elements within the cylinder 110. The back plate 182 includes a driver opening 188, and the rear side of the cam driver 168 includes a seat 190, such that the seat 190 bears against the back plate 182, allowing the cam driver 168 to rotate within the driver opening 188 in the back plate 182.

The first cam 26 is mounted on the outside of the cylinder 110 to the cam driver 168. A generally rectangular prism 192 extends rearwardly from the cam driver 168, and the first cam 26 includes a recess 194 shaped to receive the rectangular prism 192. Accordingly, when the cam driver 168 is rotated, the rectangular prism 192 rotates the first cam 26. The second cam 28 bears against the first cam 26, and the two cams 26, 28 are held together via a cam screw 196 that extends into the cam driver 168.

The cam screw 196 includes a shaft 198, a shoulder 200, and a threaded portion 202. The second cam 28 is configured to displace axially along the shaft 198. The shoulder 200 affixes the first cam 26 to the cam driver 168.

A spring 204 is disposed between the second cam 28 and a head of the screw 196 such that the spring 204 biases the second cam 28 against the first cam 26. As will be described in more detail below, the second cam 28 and first cam 26 include V-shaped locators that locate the proper orientation between the two, but allow the second cam 28 to be lifted off the first cam 26 (against the force of the spring 204) and repositioned relative to the first cam 26.

A bracket 206 is mounted to the cylinder back plate 182 via two screws 208. An arm 210 is rotatably mounted in the bracket 206. The arm 210 includes a button 212 disposed in a circular recess 214 in the bracket 206, which allows the arm 210 to pivot to either a left position or a right position. The arm 210 includes a first nub 213 that can be positioned in either a left or right positioning recess 215 in the bracket 206. Again as will be described in more detail below, the positionability of the arm 210 allows the lock cylinder assembly 10 to be used with either left-hand or right-hand operation.

The cylinder assembly 14 depicted in FIG. 6 includes the first and second cams 26 and 28. But one of ordinary skill will understand that the cam driver 168 can be coupled to the tailpiece 266 of the embodiment of FIG. 2*a*, and it likewise can be coupled to the single cam 270 of the embodiment of FIG. 2*b*.

Figure 9:
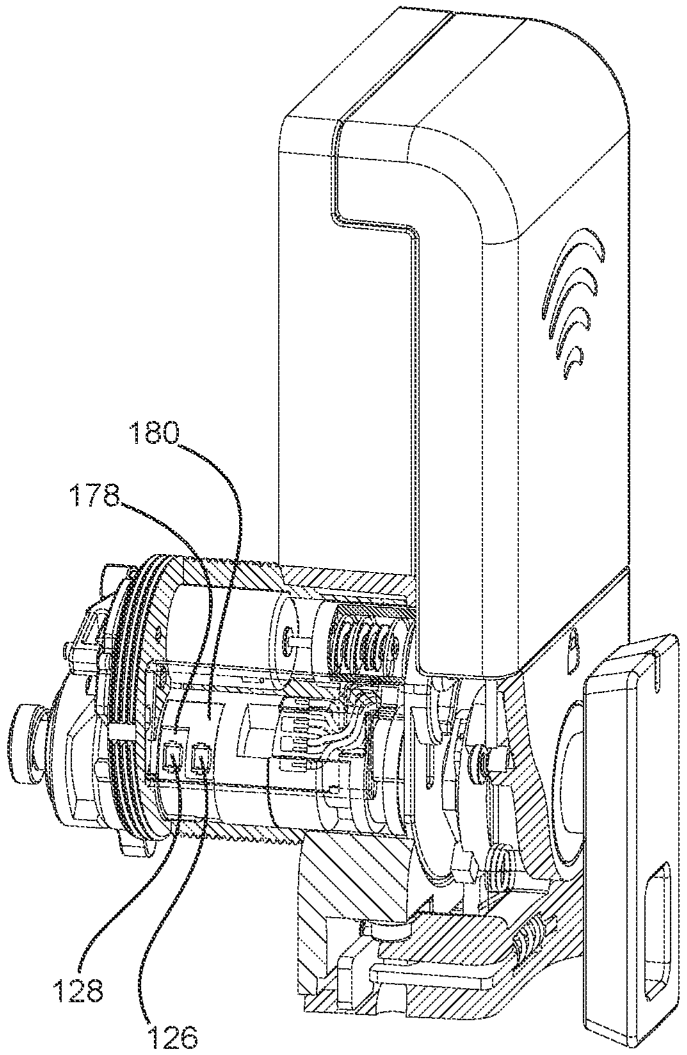
FIG. 9 is the same view as FIG. 8, but incorporating a circuit board and sensors of the cylinder assembly.
Figure 10:
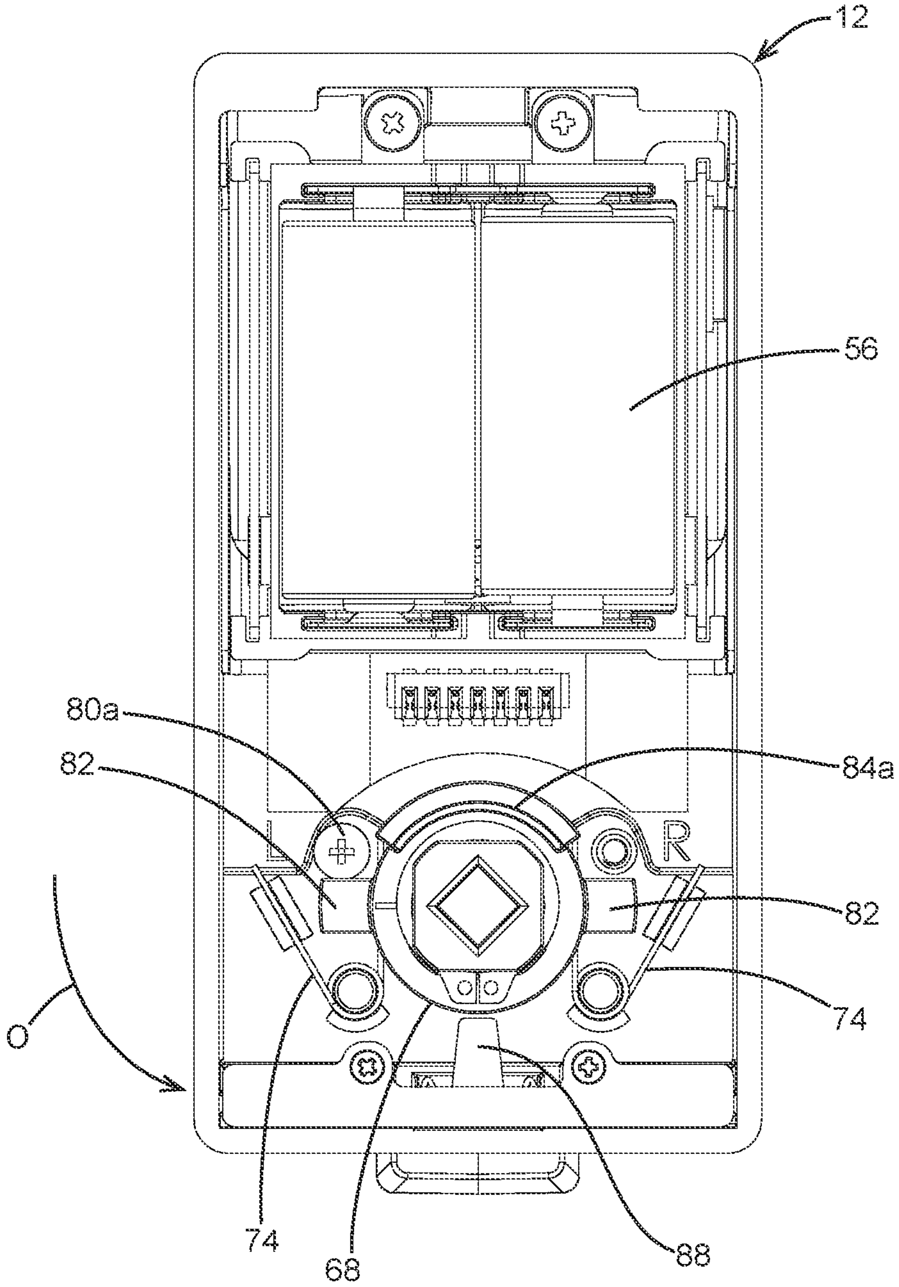
FIG. 10 is a detail elevation view of the lock cylinder assembly of FIG. 1, in the locked cylinder/bolted door position.

Referring now to FIGS. 7-21, operation of the lock cylinder assembly 10 is shown. In FIGS. 7-11, the locked cylinder/bolted door position is depicted. Here the clutch 132 is in a retracted state, with the slider 160 having pushed the clutch 132 away from the cam driver 168 and toward the knob 20. In this position, the clutch fingers 144 do not engage the cam driver 168, and while the knob 20 may be freely turned, there is no corresponding rotation of the cam driver 168 or the cams 26, 28. Since the cam driver 168 is not rotated, the user rotating the knob 20 does not affect the position of the deadbolt or latch. Referring specifically to FIG. 9, in this position the first optical sensor 126 overlies the shielding ring 180, and the second optical sensor 128 overlies the reflecting ring 178, thereby indicating to the processor that the cam driver 168 is in the locked cylinder/bolted door position. Referring now to FIG. 10, a simplified rear elevation view of the control assembly 12 is shown. Here, the screw 80*a* for left operation is installed. Tab 82 bears against it, and the screw 80*a* prevents the knob 20 from rotating in a direction opposite to the direction O. In this embodiment, second tabs 84 are replaced with a pushbar 84*a*.

Figure 7:
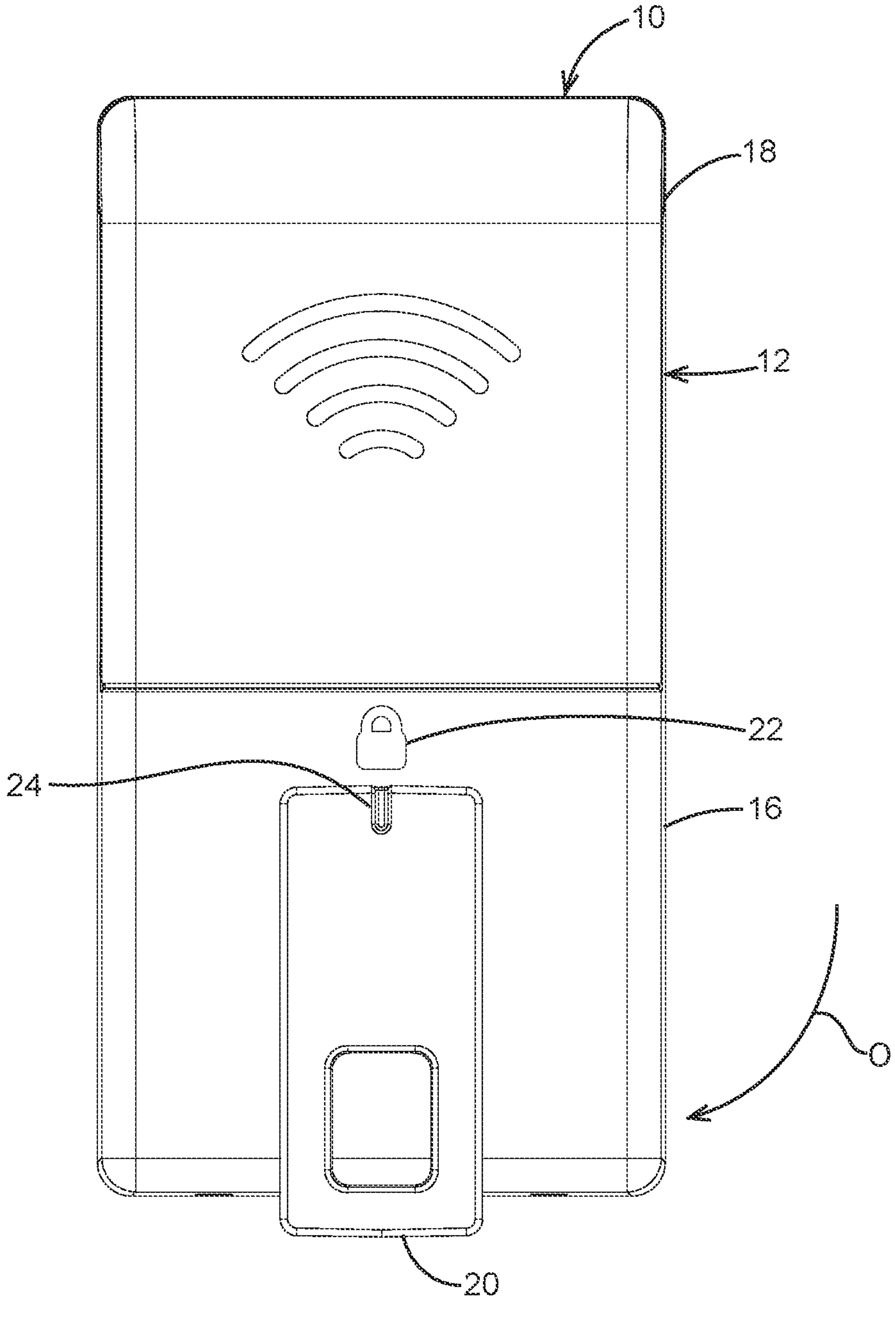
FIG. 7 is a front view of the lock cylinder assembly of FIG. 1 in the locked cylinder/bolted door position.
Figure 8:
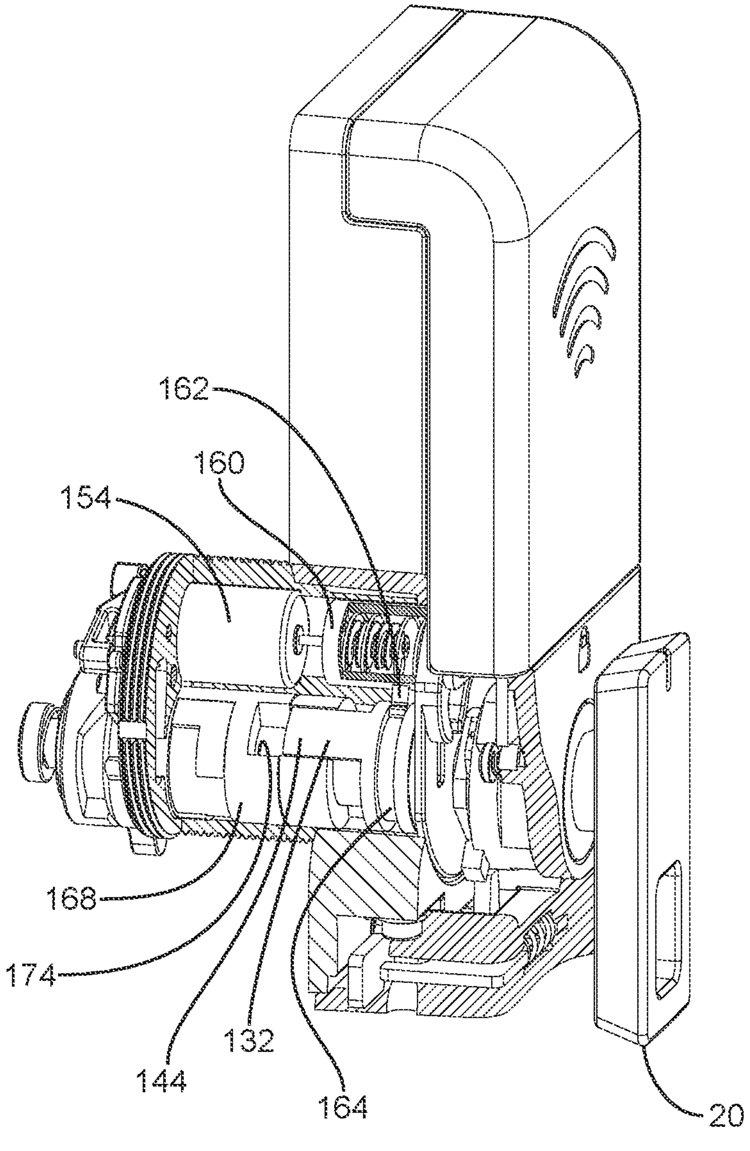
FIG. 8 is a perspective view of the lock assembly of FIG. 1, in partial cutaway, in the locked cylinder/bolted door position.
Figure 11:
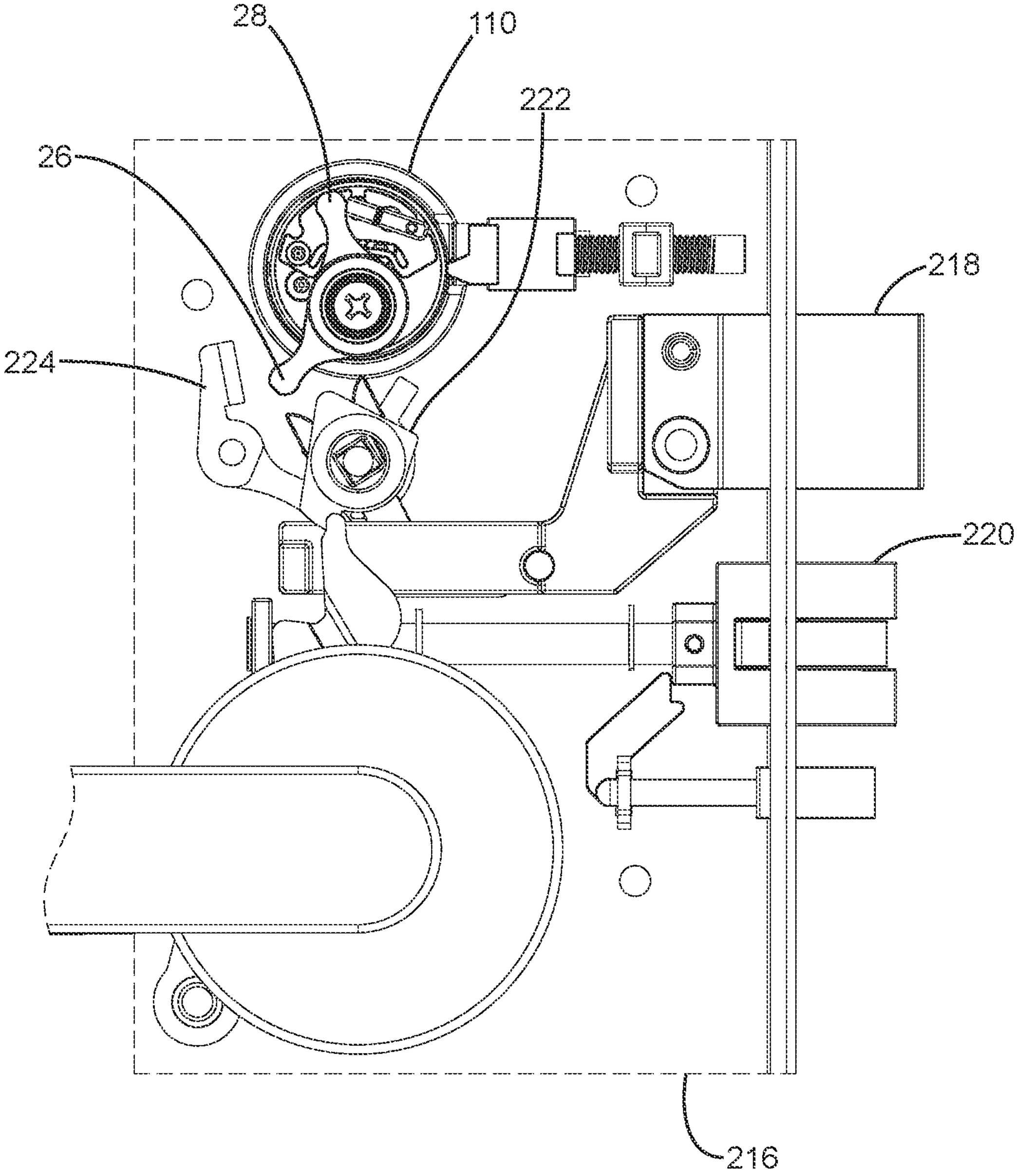
FIG. 11 is a partial elevation view of a mortise door lock, incorporating the lock cylinder assembly of FIG. 1, also set in the locked cylinder/bolted door position.

Referring now to FIG. 11, a simplified elevation view of a mortise lock 216 is shown, with the cylinder 110 installed in the mortise lock 216, and the first and second cams 26, 28 are disposed in the bolted door position. A deadbolt 218 and a door latch 220 extend out from the body of the mortise lock 216. The first and second cams 26, 28 have not engaged either the deadbolt rocker arm 222 or the latch rocker arm 224. As shown in FIGS. 7 and 10, the knob is rotated in direction O once the lock cylinder assembly 10 is unlocked (note that the direction O is the two figures appears in opposite directions because FIG. 7 is depicting the control assembly 12 from the front, and FIG. 10 is depicting the control assembly 12 from the rear).

Figure 12:
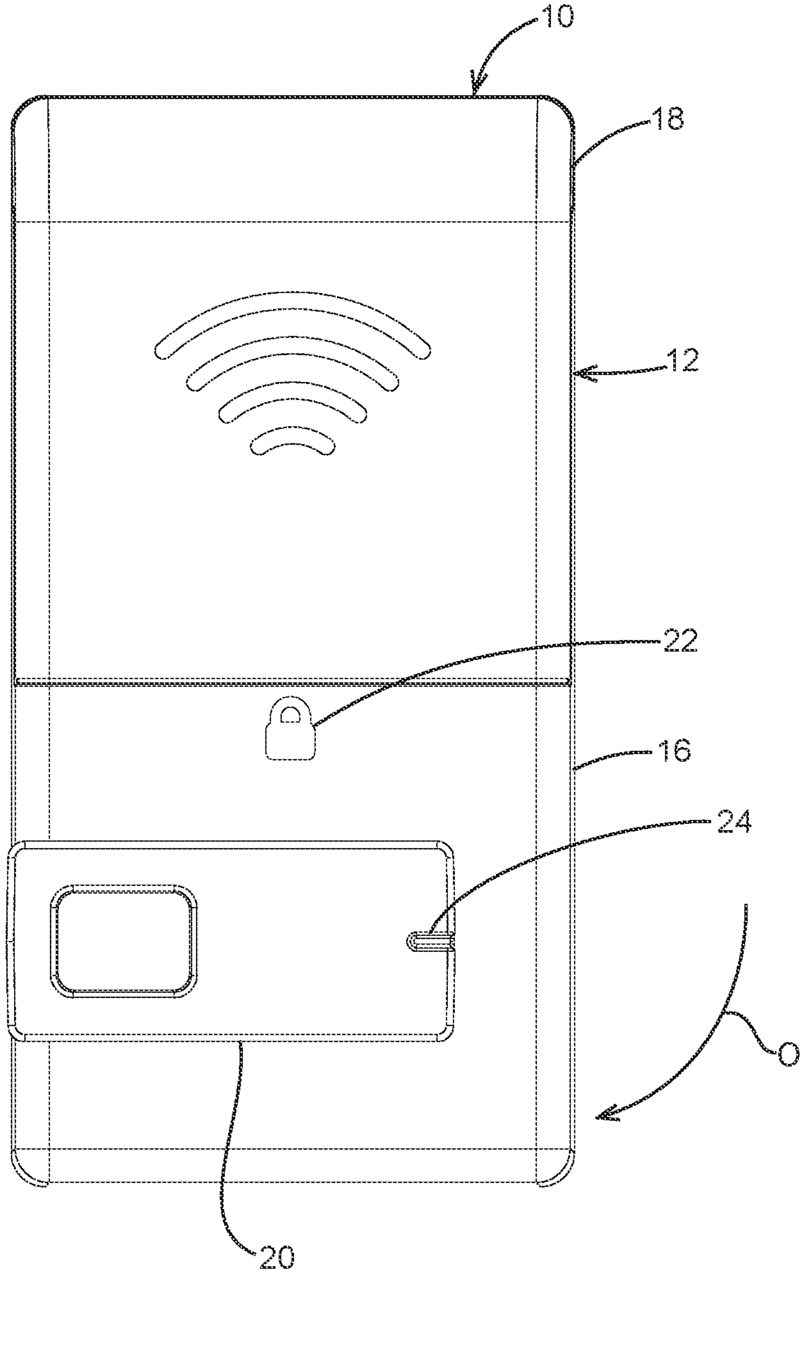
FIG. 12 is a front view of the lock assembly of FIG. 1 in the unlocked cylinder/unbolted door position.
Figure 13:
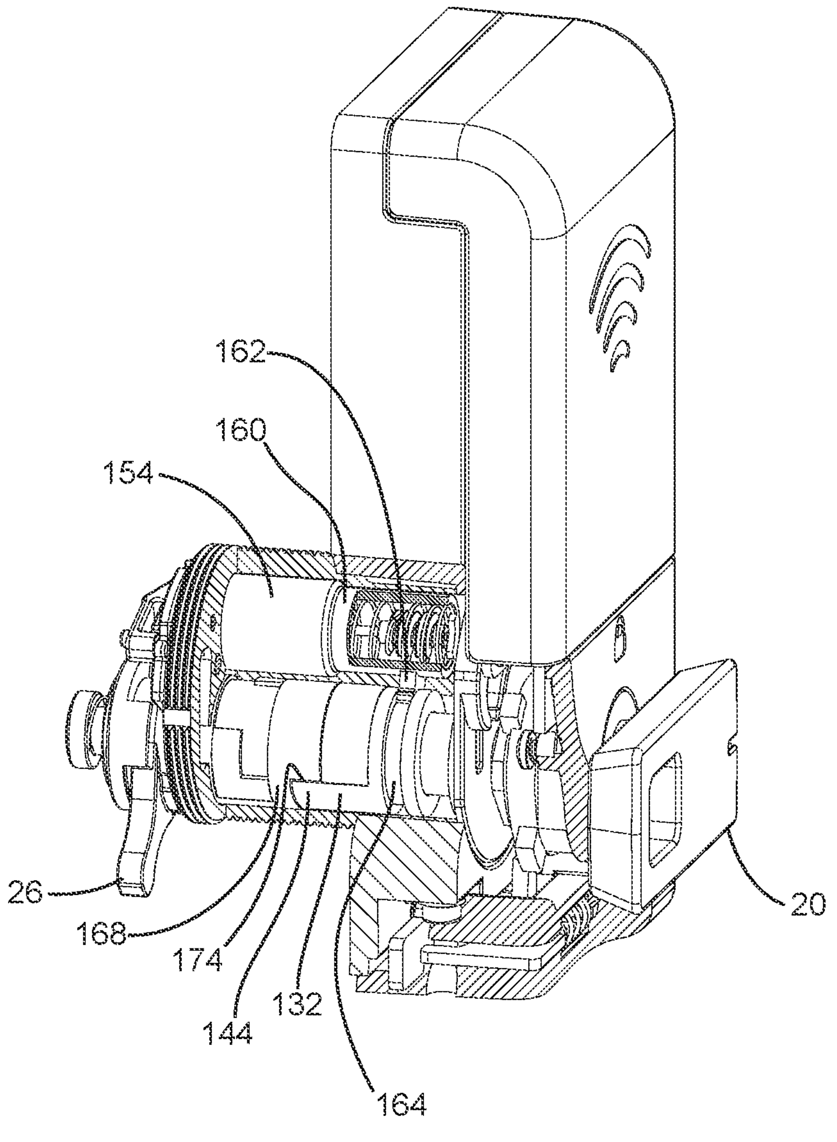
FIG. 13 is a perspective view of the lock assembly of FIG. 1, in partial cutaway, in the unlocked cylinder/unbolted door position.
Figure 14:
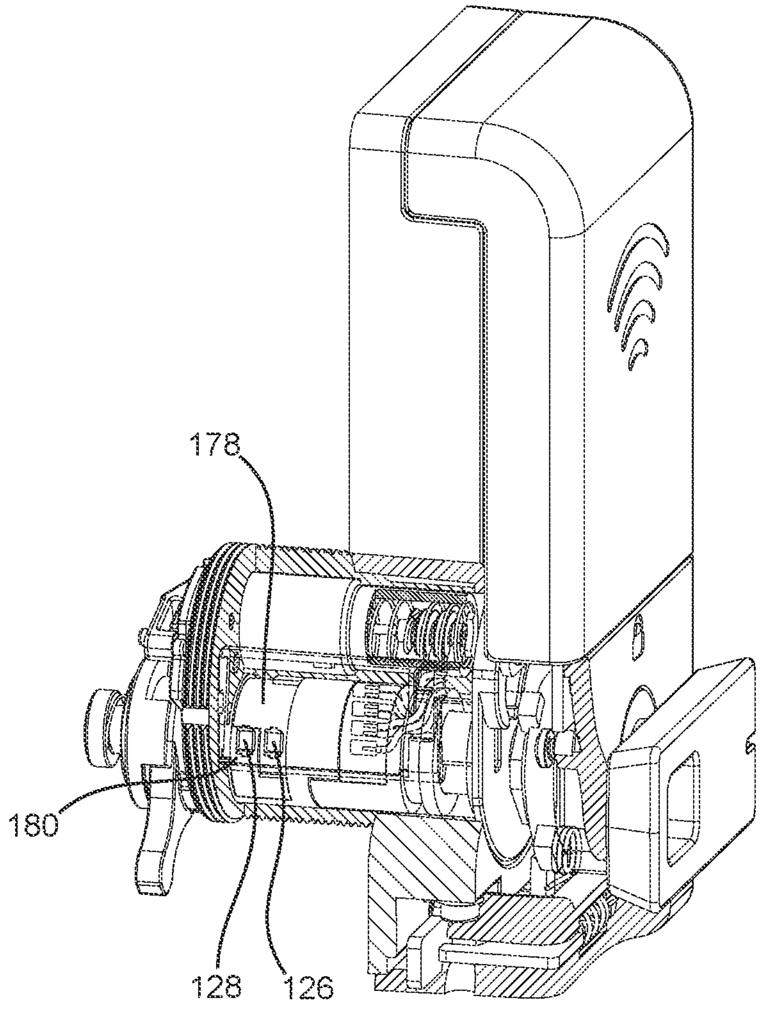
FIG. 14 is the same view as FIG. 13, but incorporating the circuit board and sensors of the cylinder assembly.
Figure 15:
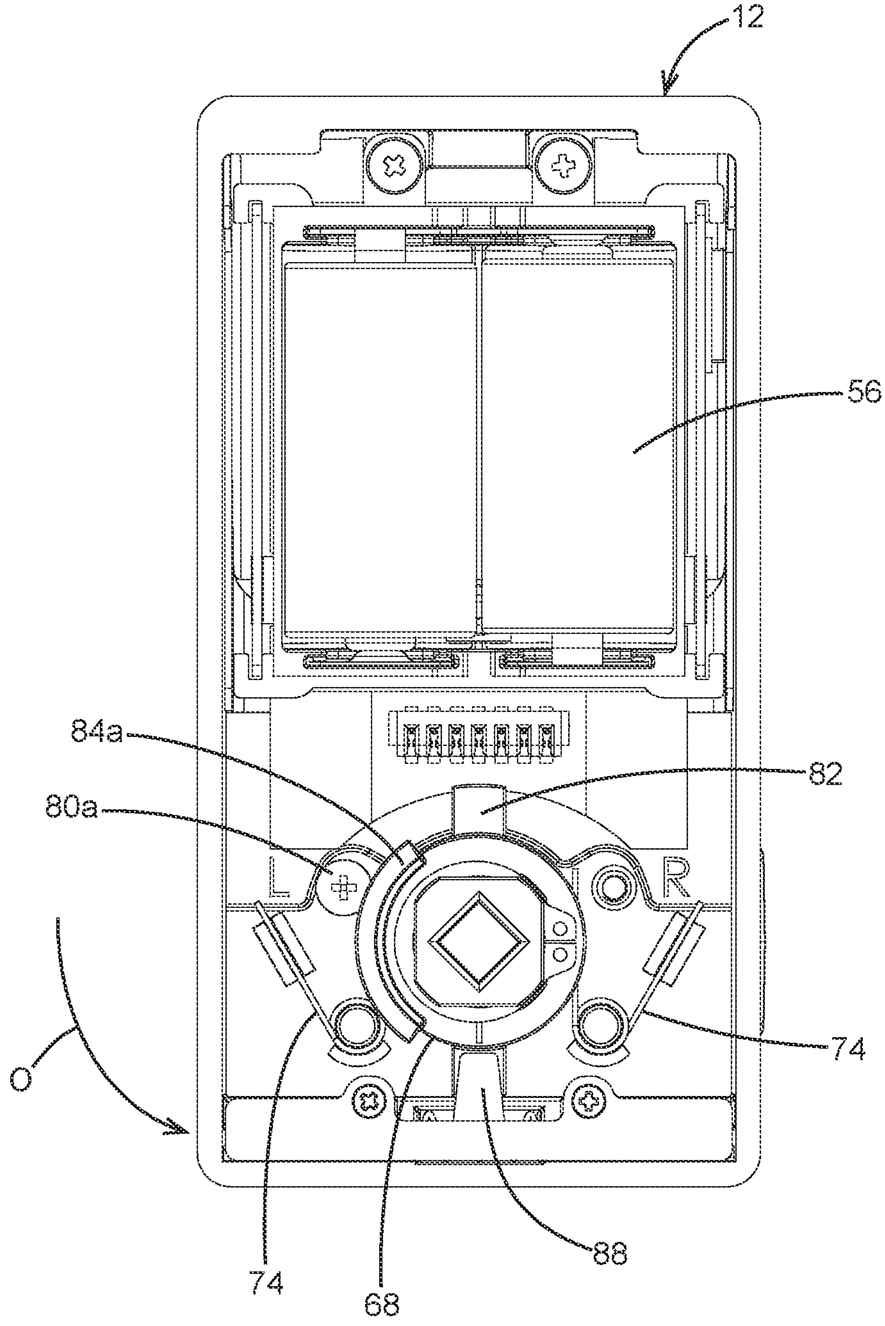
FIG. 15 is a detail elevation view of the lock cylinder assembly of FIG. 1, in the unlocked cylinder/unbolted door position.
Figure 16:
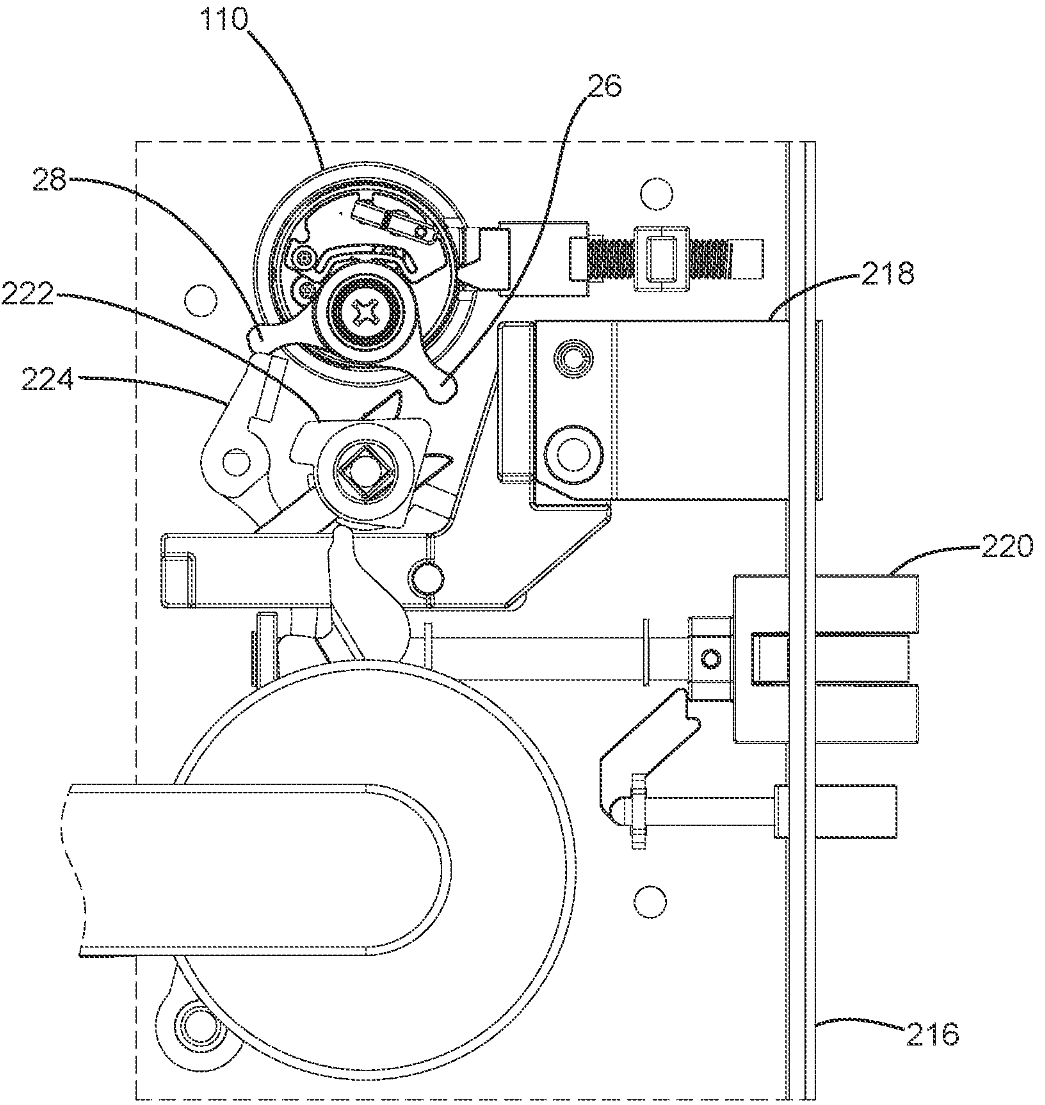
FIG. 16 is a partial elevation view of the mortise door lock of FIG. 11, set in the unlocked cylinder/unbolted door position.
Figure 17:
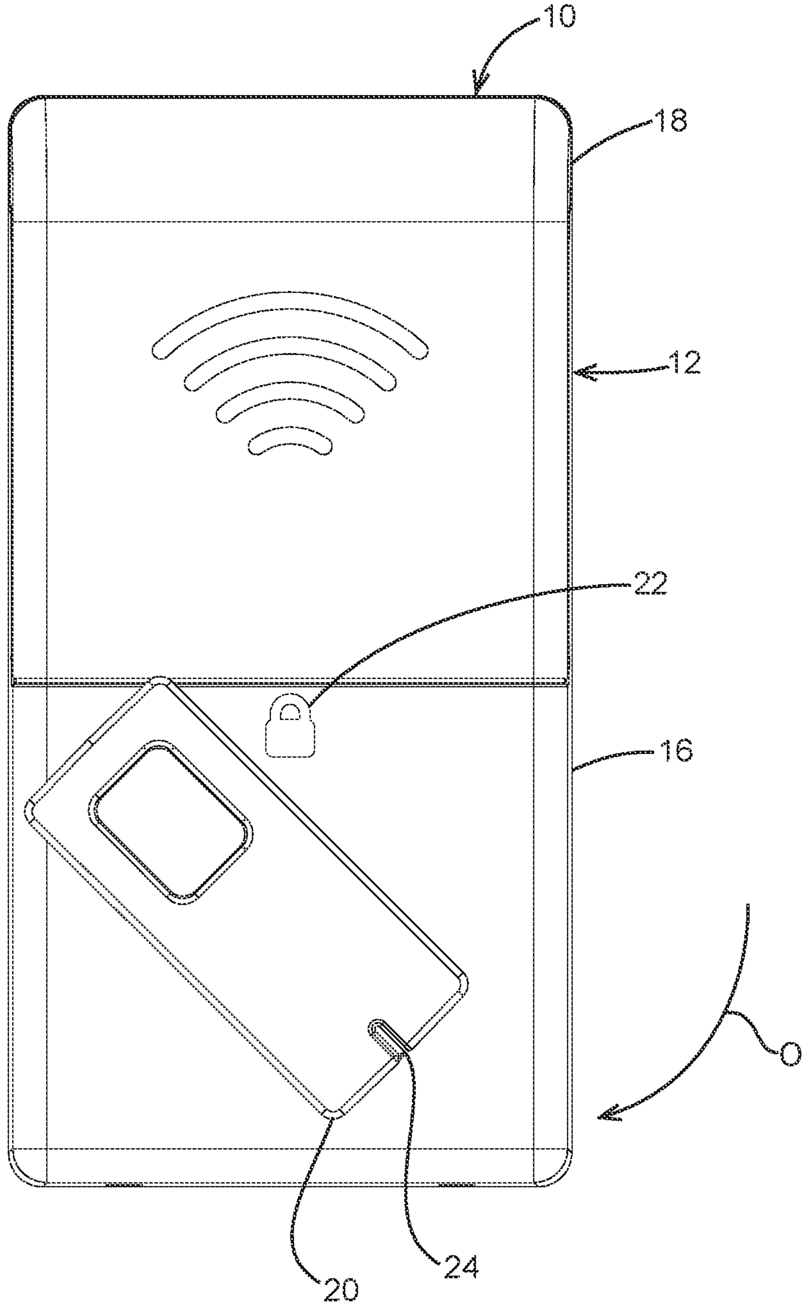
FIG. 17 is a front view of the lock cylinder assembly of FIG. 1 in the unlocked cylinder/unlatched door position.

Referring now to FIGS. 12-16, the cylinder 110 and the mortise lock 216 have been moved to the unlocked cylinder/unbolted door position. Here, the user has entered his or her credential, and the processor has directed the motor 154 to translate the slider 160 which has pulled the clutch 132 into engagement with the cam driver 168. In particular, the fingers 144 of the clutch 132 have slid into the finger recesses 174 of the cam driver 168, such that rotation of the knob 20 will rotate the cam driver 168. The user has further rotated the knob 20, and the cams 26, 28 are thereby rotated. Referring to FIG. 14, the first sensor 126 overlays the reflecting ring 178, and the second sensor 128 overlies the shielding ring 180. Referring now to FIGS. 12, 15, and 16, the knob 20 has been rotated a quarter turn 16, the first cam 26 has engaged the bolt rocker arm 222 within the mortise lock 216, which has pulled the deadbolt 218 so that it is completely within the housing of the mortise lock 216. The second cam 28 has yet to engage the latch rocker arm 224.

Figure 18:
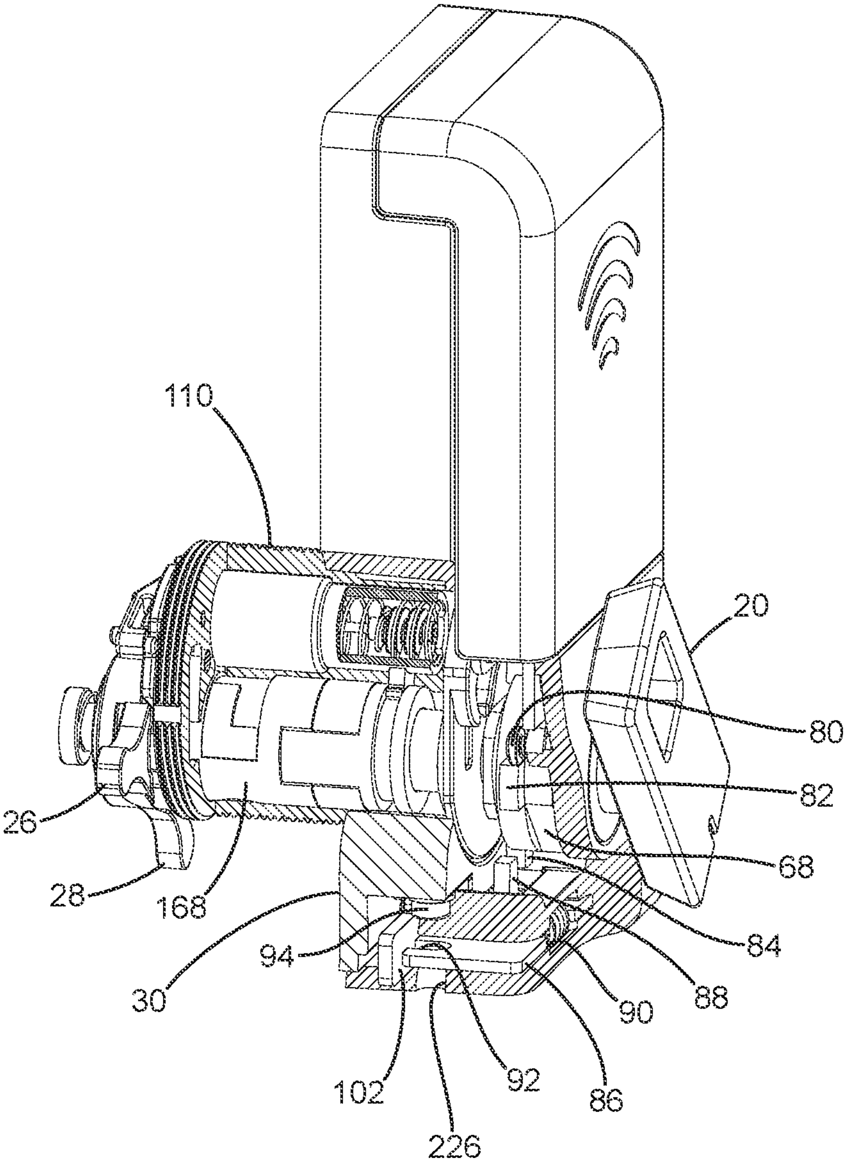
FIG. 18 is a perspective view of the lock cylinder assembly of FIG. 1, in partial cutaway, in the unlocked cylinder/unlatched door position.
Figure 19:
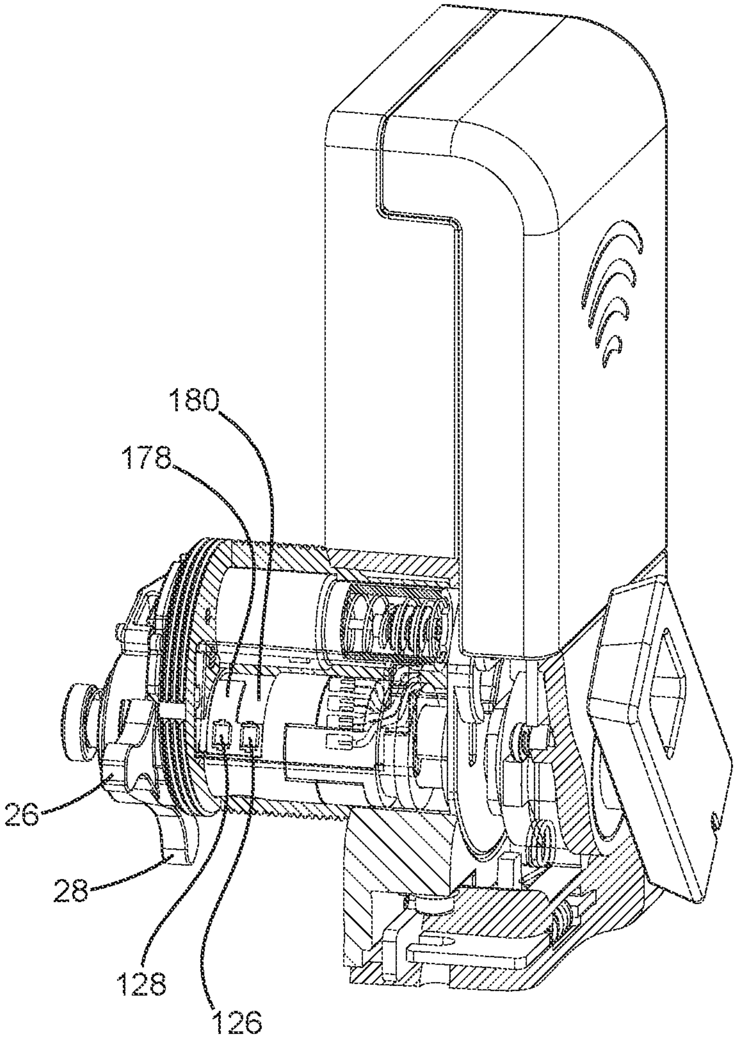
FIG. 19 is the same view as FIG. 18, but incorporating the circuit board and sensors.
Figure 20:
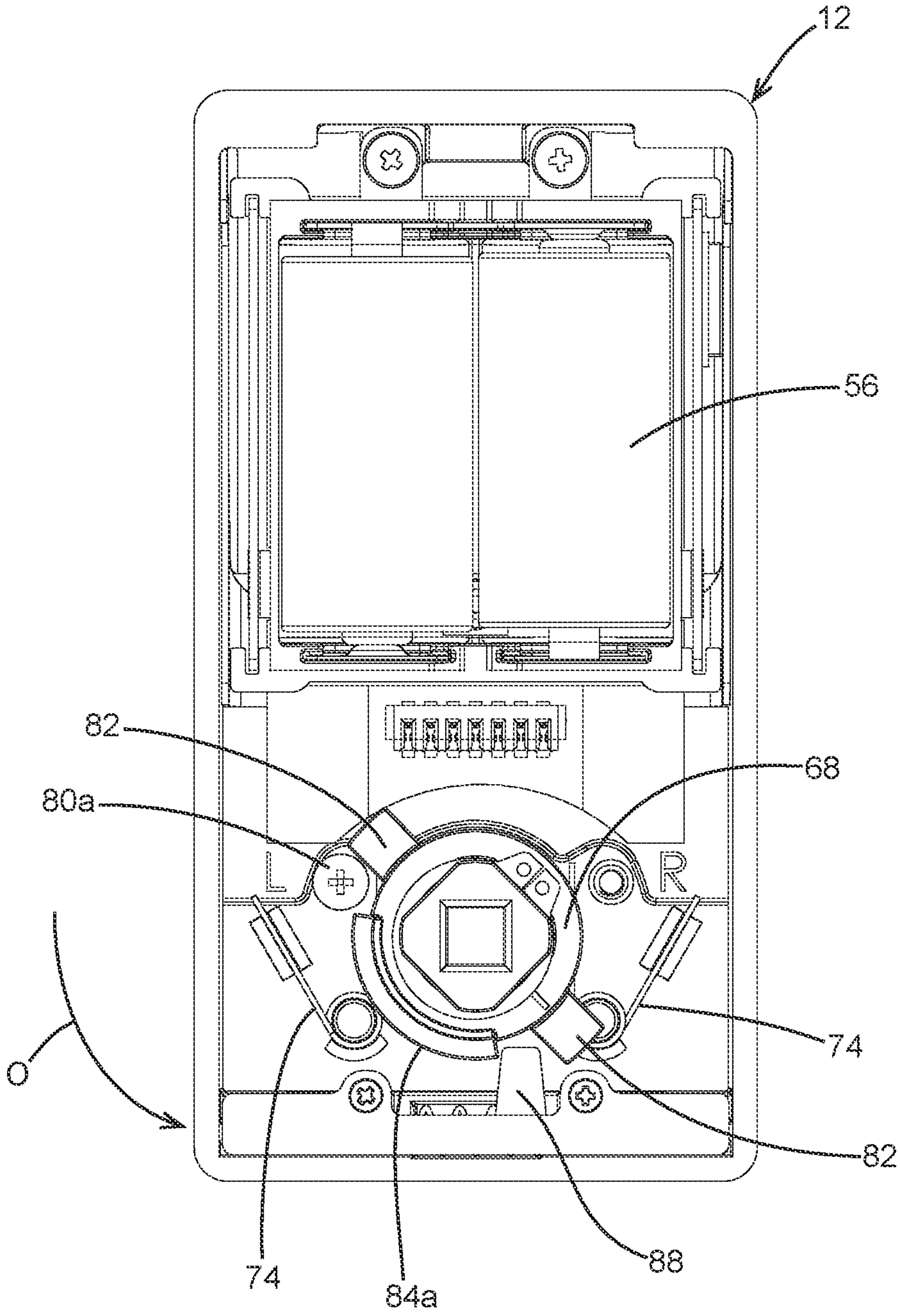
FIG. 20 is a detail elevation view of the lock cylinder assembly of FIG. 1, in the unlocked cylinder/unlatched door position.
Figure 21:
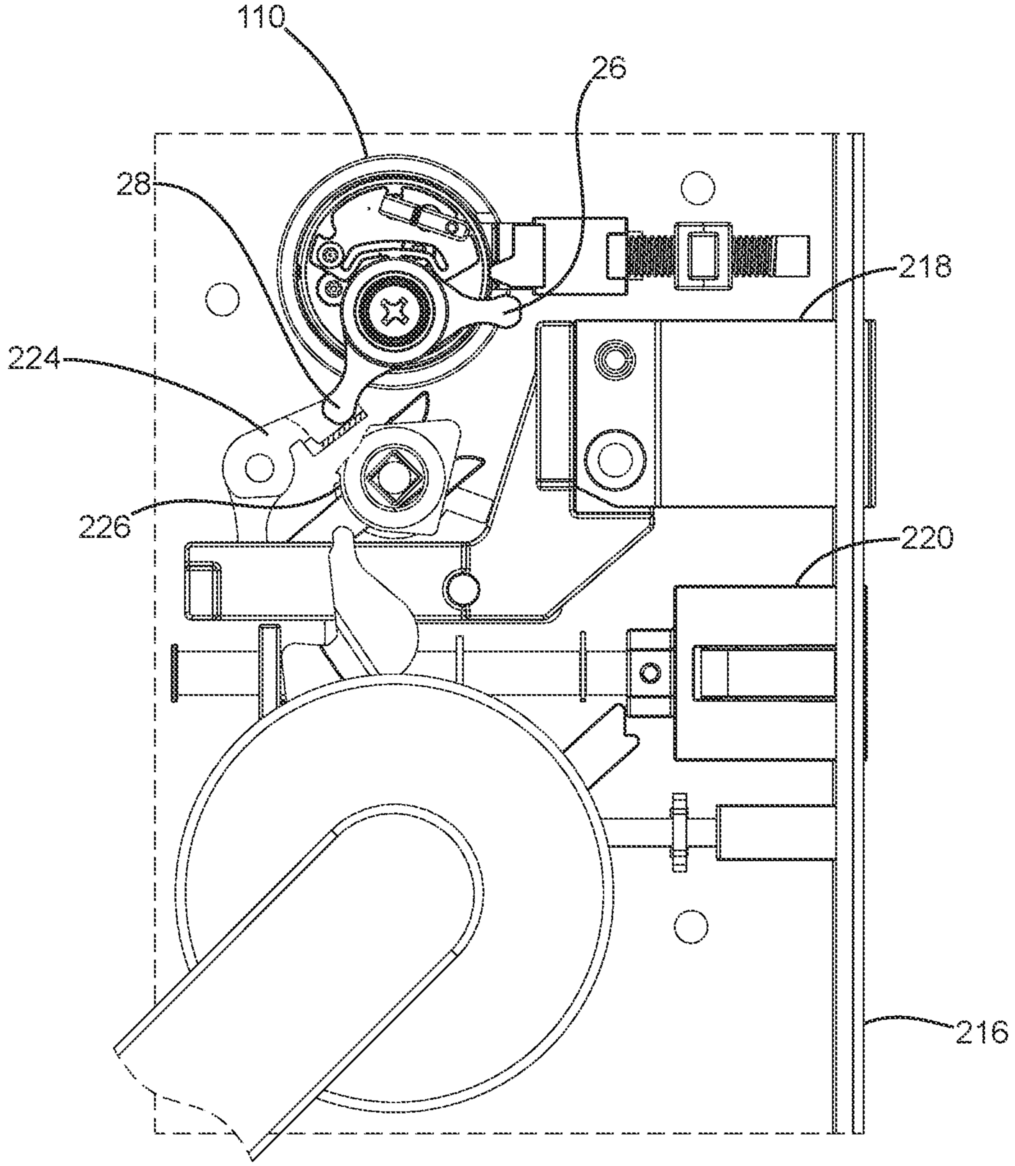
FIG. 21 is a partial elevation view of the mortise door lock of FIG. 1 in the unlocked cylinder/unlatched door position.
Figure 22:
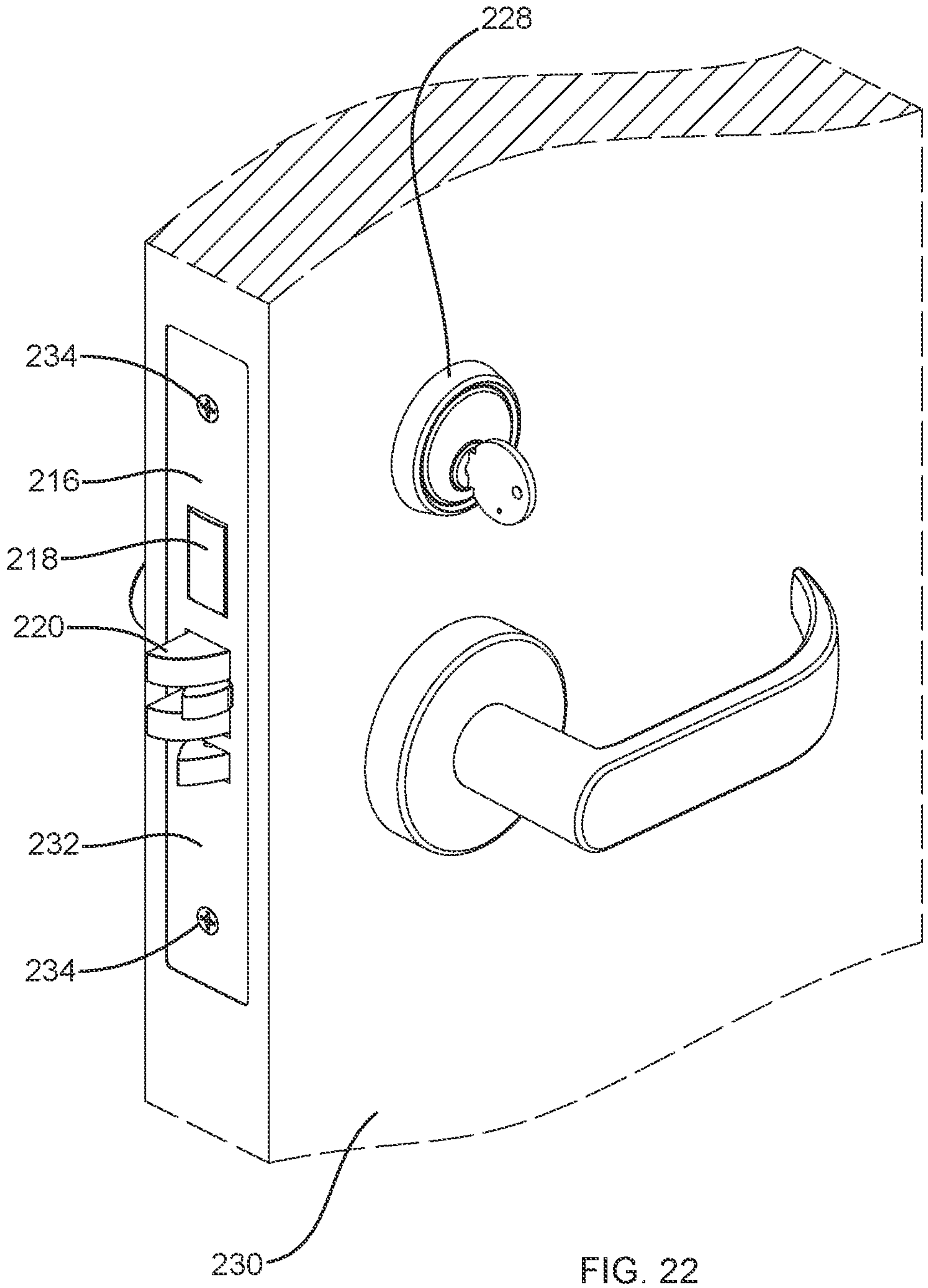
FIG. 22 is a partial perspective view of a mortise door lock with a prior art manually operated cylinder mounted in a door.
Figure 23:
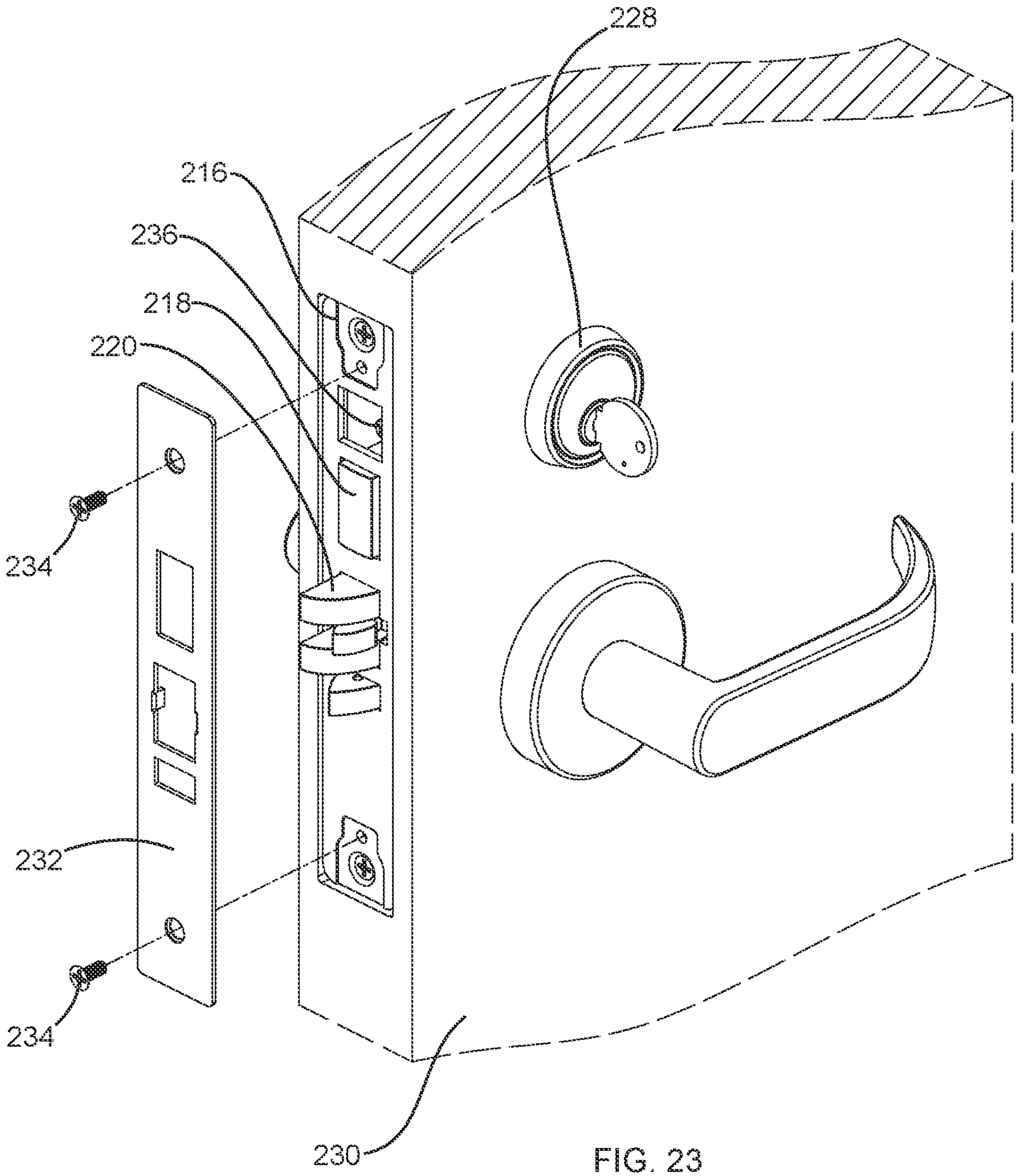
FIGS. 23-26 are partial perspective views of the mortise door lock of FIG. 16 depicting steps in the removal of a mechanical cylinder.
Figure 24:
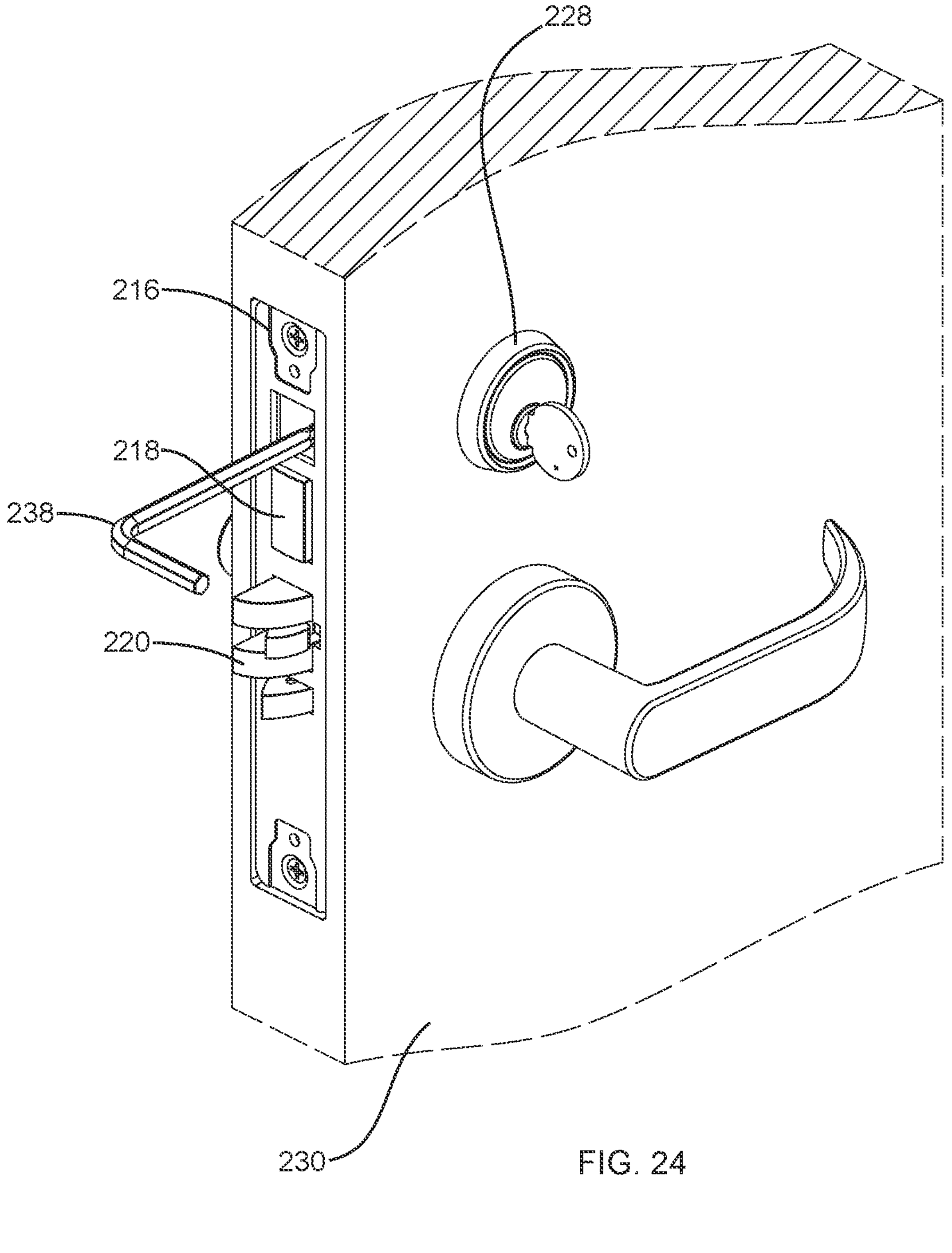
Figure 25:
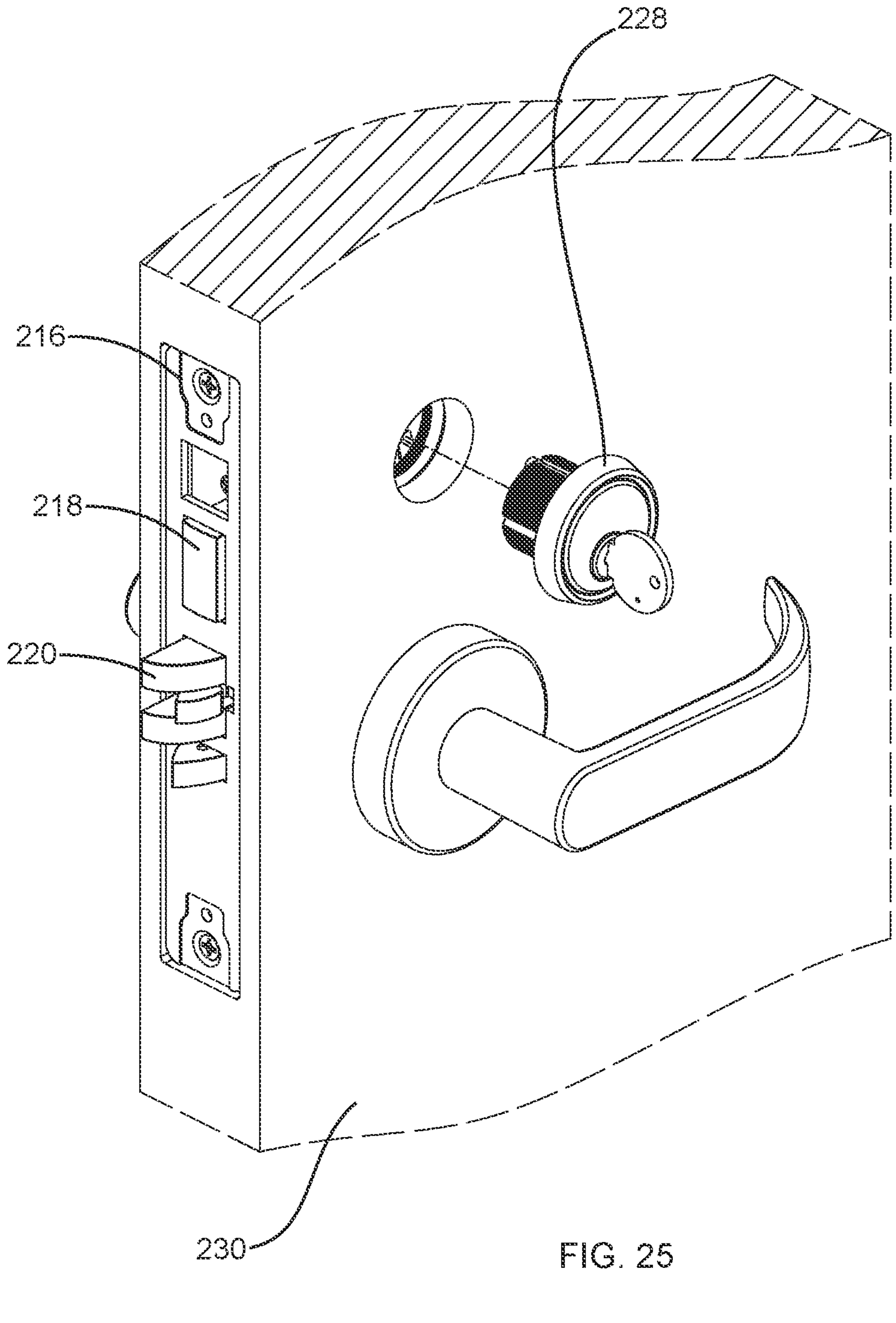
Figure 26:
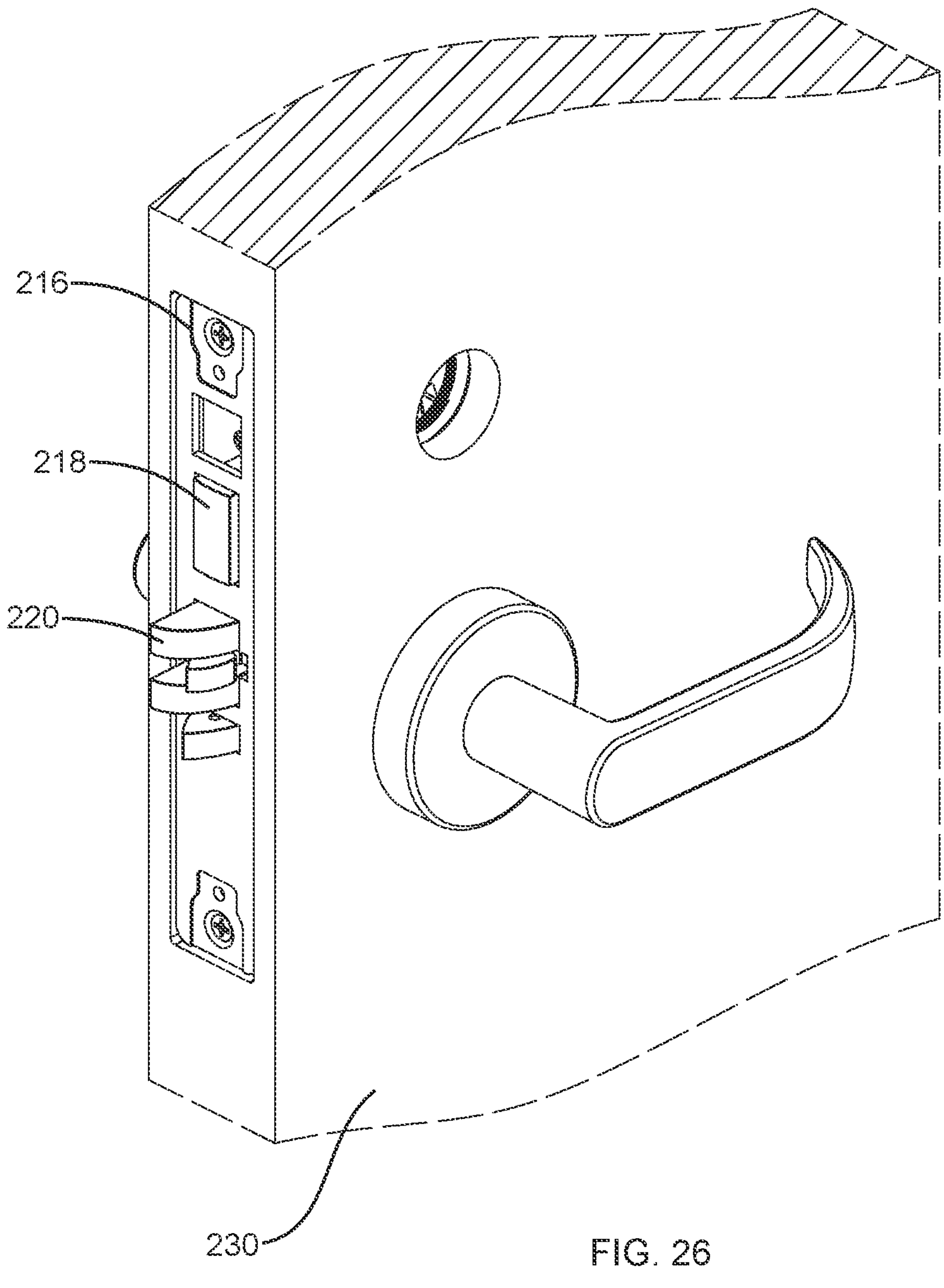

Referring now to FIGS. 17-21, the cylinder 110 is still in the unlocked position, and the mortise lock has been shifted to the unlatched door position. The positioning of the components within the cylinder relative to each other are generally the same, except the user has rotated the knob 20 and eighth turn further, and therefore the cam driver 168, first cam 26, and second cam 28 have been rotated further. Referring now to FIG. 19, both the first sensor 126 and the second sensor 128 overlie the reflecting ring 178. And as shown in FIG. 21, the second cam 28 has engaged the latch rocker arm 224, which pulls the latch 220 to inside the mortise lock 216, as known in the art. In this position, the mortise lock 216 poses no interference with opening the door in which it is disposed. Due to the double cam structure, the user is not required to turn the knob two fulls turns to both retract the deadbolt and retract the latch. Both the deadbolt and the latch can be retracted in less than a full turn. In the embodiment shown in FIG. 2*b*, which is designed for a mortise lock with a door latch but no bolt, the single cam 270 will operate to retract the door latch with less than a single turn, as is known in the art. The cylinder assembly 14 with a single cam 270 could also operate a deadbolt as well as a latch as in the prior art, but this would require multiple rotations and elimination of the structure for limiting the rotation of the cylinder, such as the screws 80*a* and 80*b*.

Referring back to FIGS. 19 and 20, further detail regarding the sliding access plate 86 is depicted. When the knob 20 is rotated to the door unlatched position as described above, the positioning piece 68 is likewise rotated with the pushbar 84*a* being rotated down and engaging the pin 88 of the sliding access plate 86, thereby translating it laterally (toward the reader in FIG. 19). By translating the sliding access plate 86 laterally, the recesses 92 align with both the locator screws 94 of the back panel 30 and openings 226 in the bottom of the control housing 16. Such alignment allows for assembly of the control housing 16 to the back panel 30 as will be described more fully later. Moreover, over-rotation is prevented. The blocking screw 80*a* prevents further rotation of the knob 20 by blocking the path of first tab 82. Note that the first tab 82 and the blocking screw 80 are located axially closer to the knob 20 than the second tab 84 (or pushbar 84*a*), and therefore the blocking screw 80*a* does not block the pushbar 84*a*.

Referring now to FIGS. 22-26, the removal of a standard cylinder is shown. First, as shown in FIG. 16, a standard mortise lock 216 with a mechanically locking deadbolt cylinder 228 disposed in a door 230 is shown. First, the faceplate 232 is removed by removing top and bottom screws 234. This exposes the cylinder set screw 236. Referring now to FIG. 18, the cylinder set screw 236 is removed with a tool 238, thereby releasing the cylinder 228. FIG. 19 depicts the removal of the known mechanically operated cylinder 228, which is removed by unscrewing it from the mortise lock 216. As shown in FIG. 20, the cylinder is now removed from the mortise lock.

Figure 27:
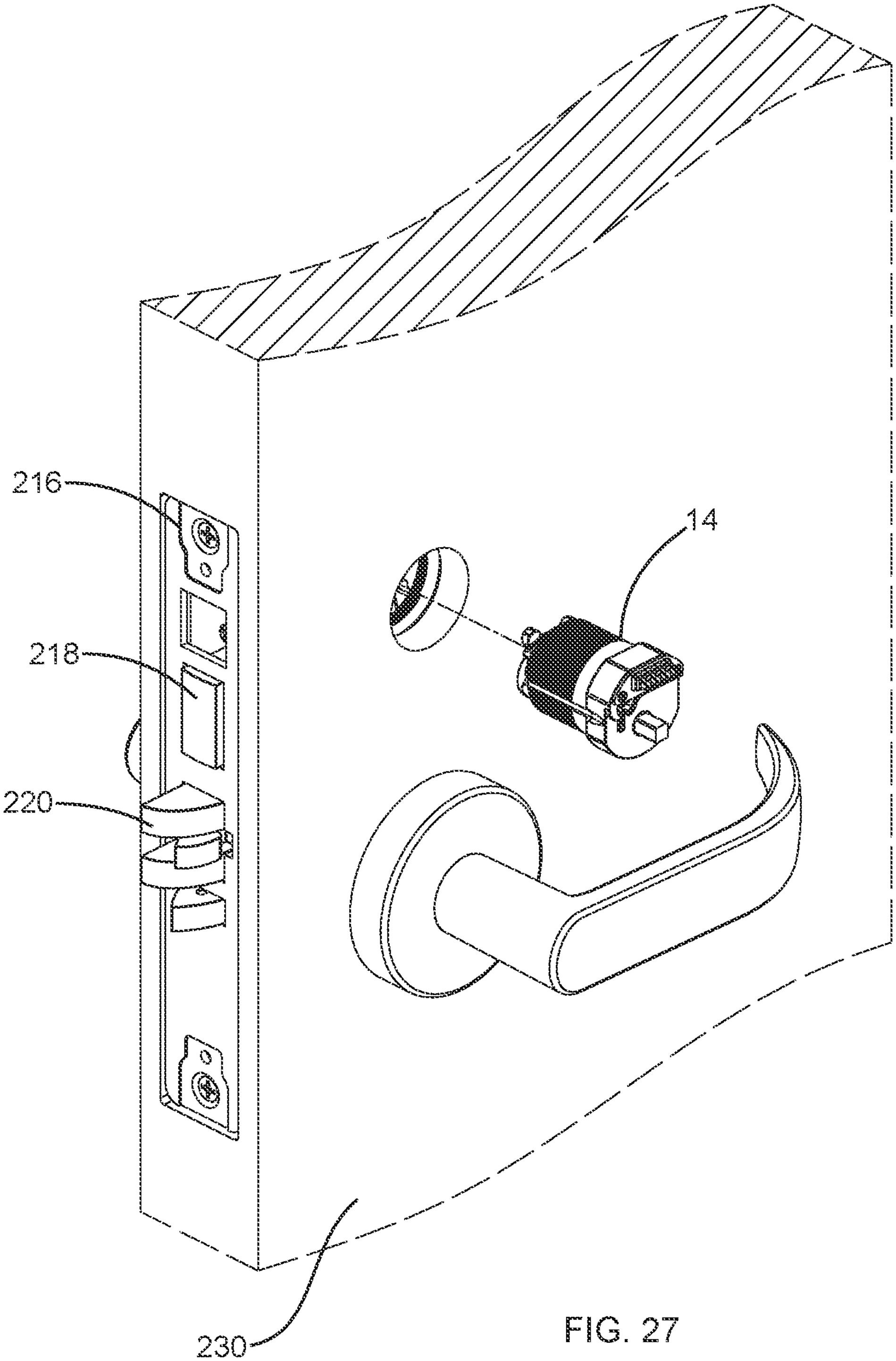
FIGS. 27-31 are partial perspective views of the mortise lock and door of FIG. 16 depicting steps in the mounting of the electronically operated cylinder of FIG. 5 to the mortise lock.
Figure 28:
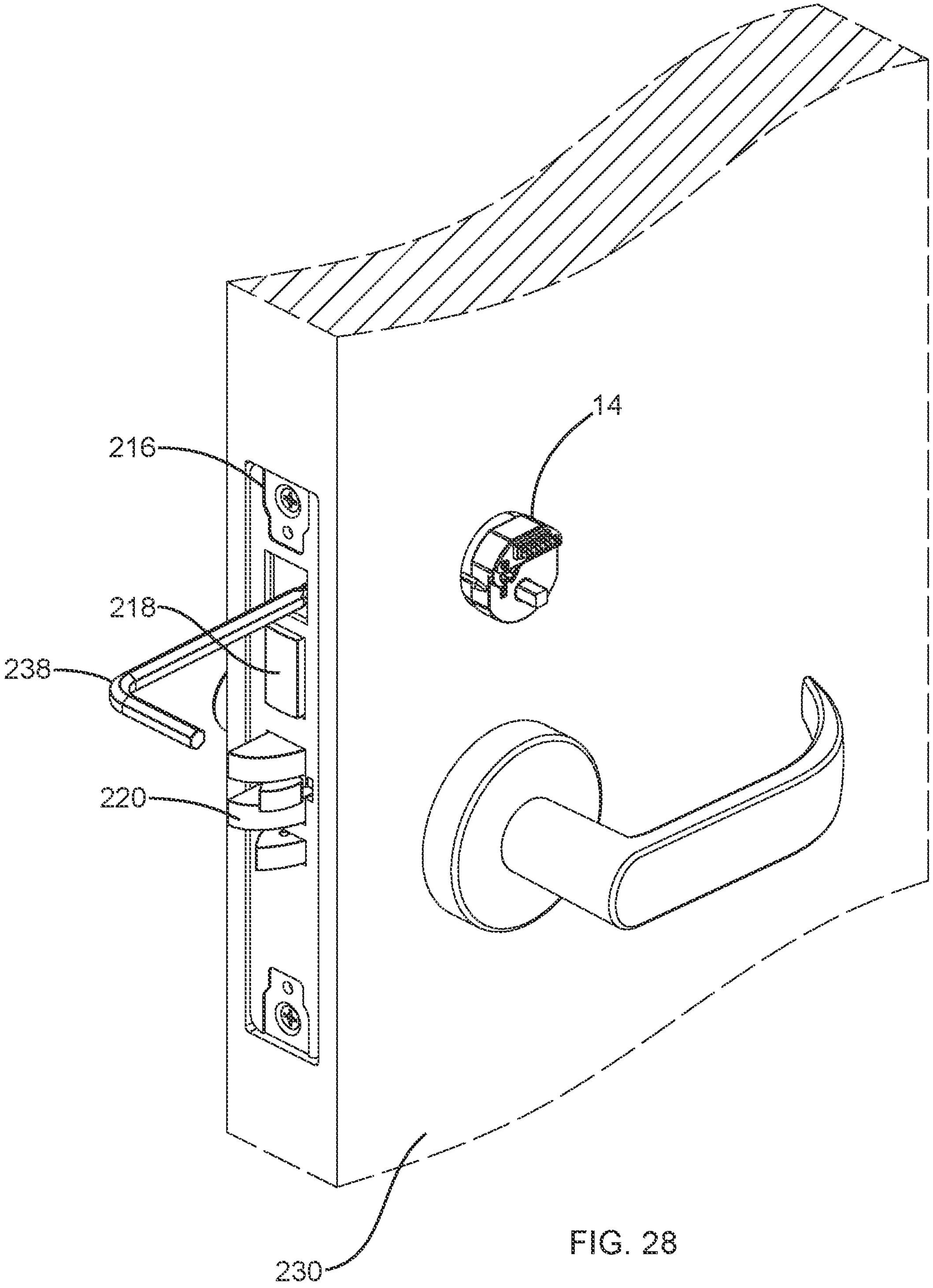
Figure 29:
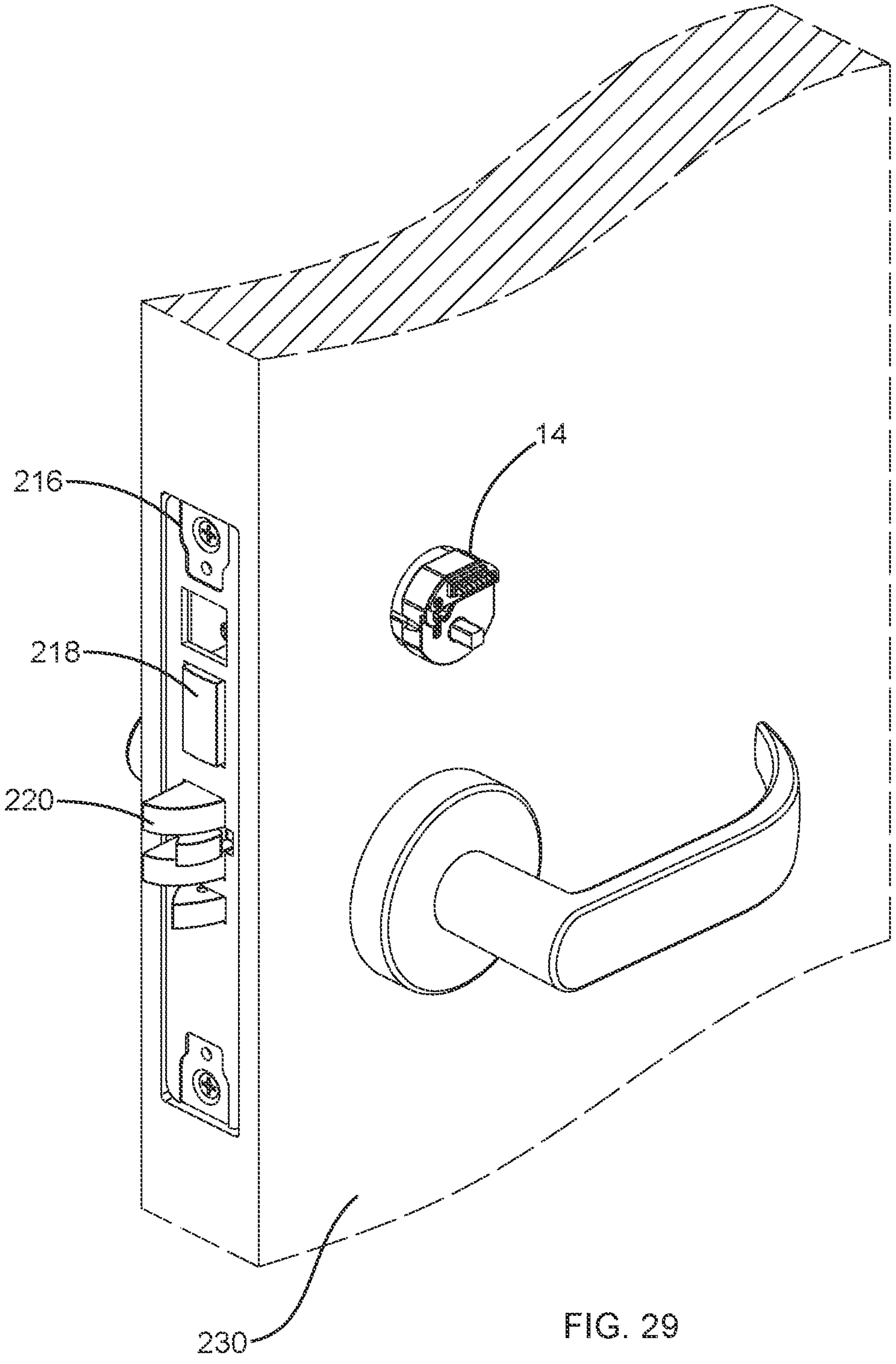
Figure 30:
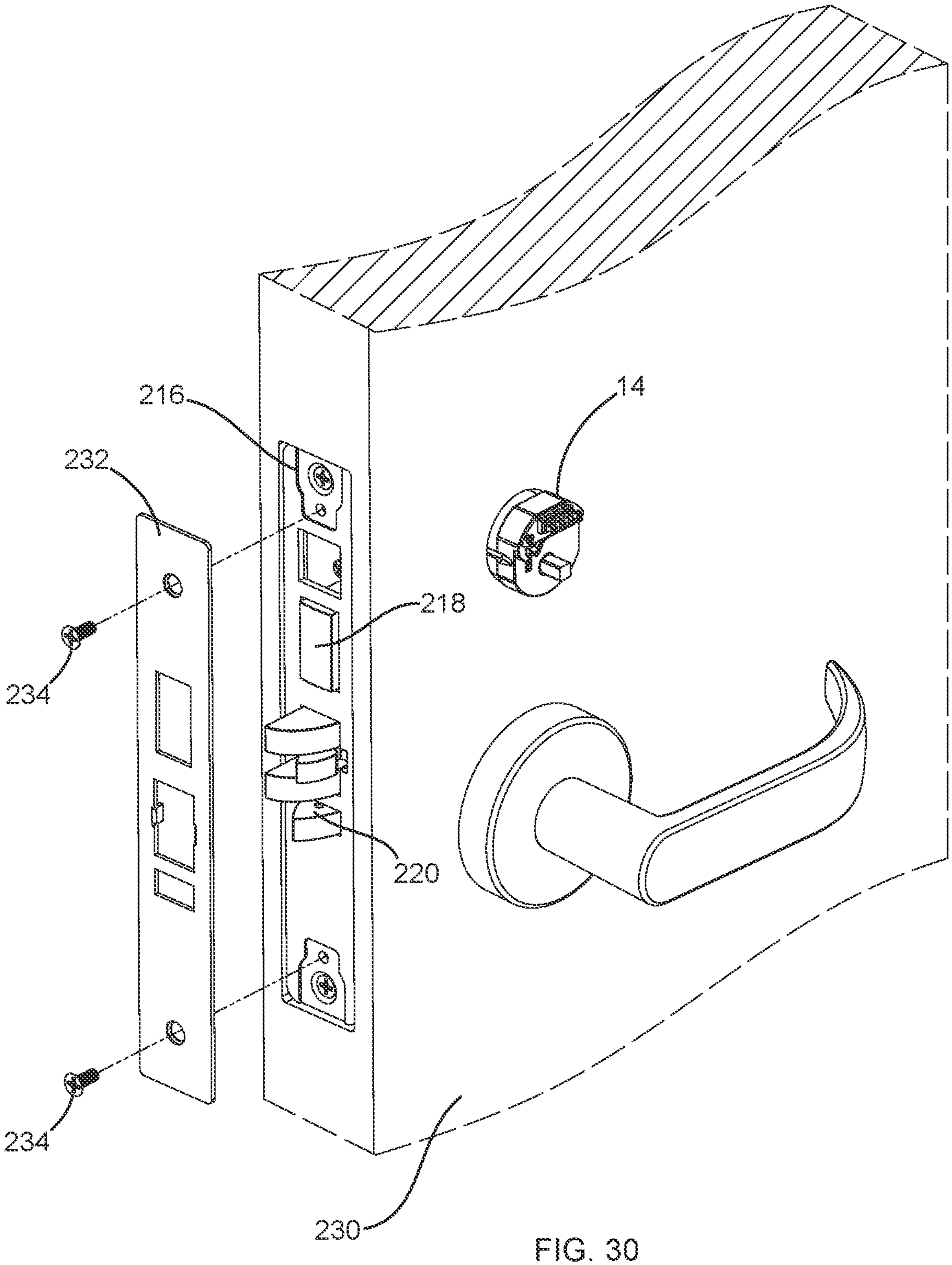
Figure 31:
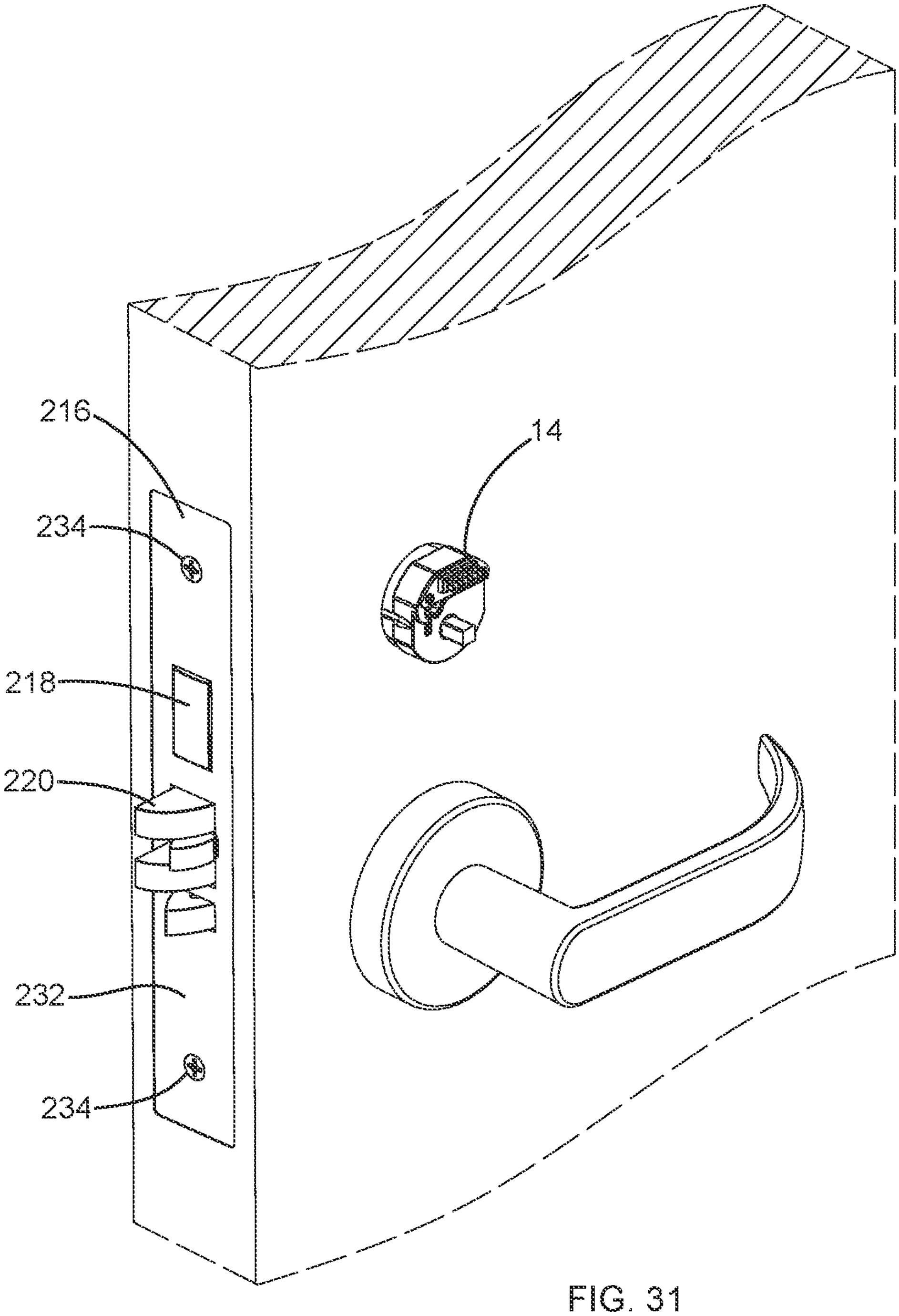

Referring now to FIGS. 27-31, the reverse steps are taken to install the electronically operated cylinder assembly 14. FIG. 27 depicts the cylinder assembly 14 just prior to being screwed into the mortise lock 216. FIG. 28 depicts the cylinder assembly 14 installed in the mortise lock 216 and resetting the cylinder set screw 236 with the tool 238 to affix the cylinder assembly 14 within the mortise lock 216. FIGS. 29-31 depict reinstalling the faceplate 232 and screwing the two screws 234 back in to reconstruct the mortise lock 216.

Figure 32:
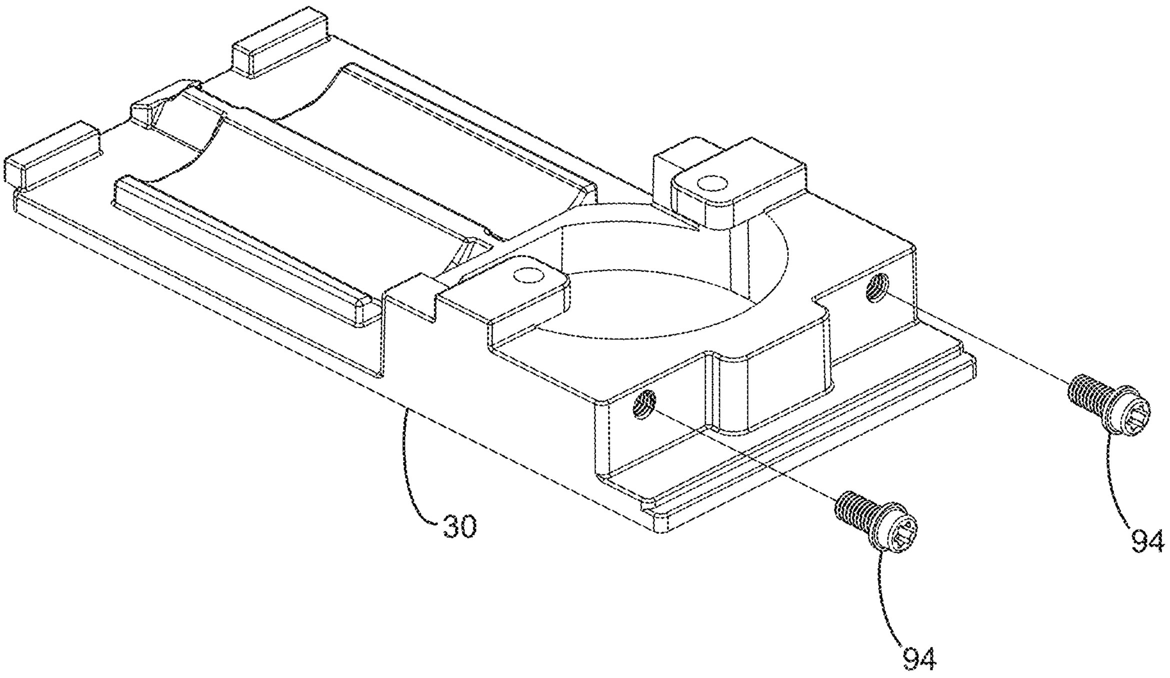
FIGS. 32 and 33 are perspective views depicting the mounting of screws to a back plate of the control housing.
Figure 33:
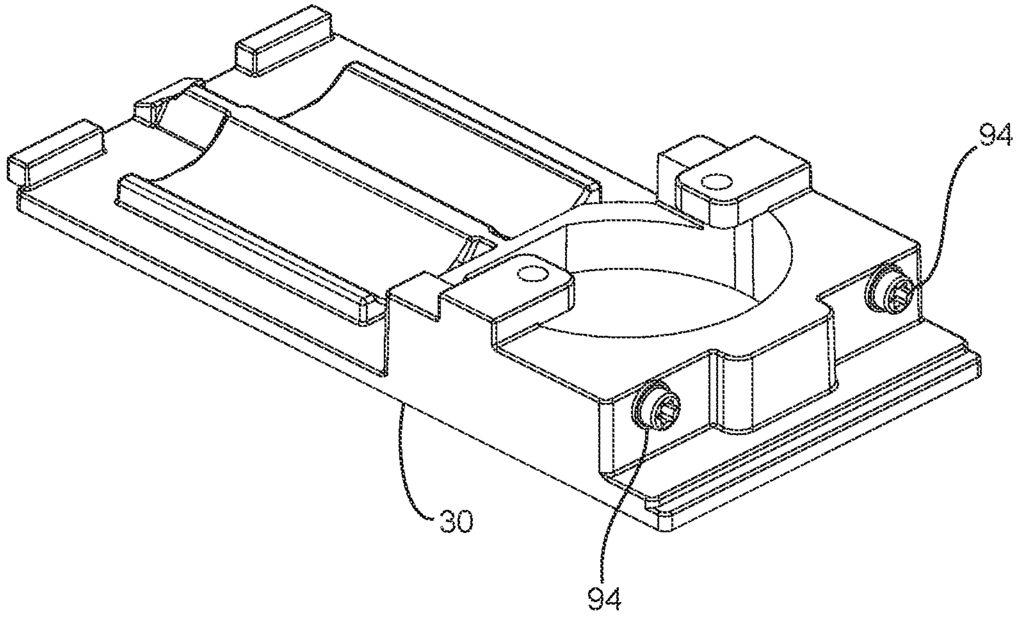
Figure 34:
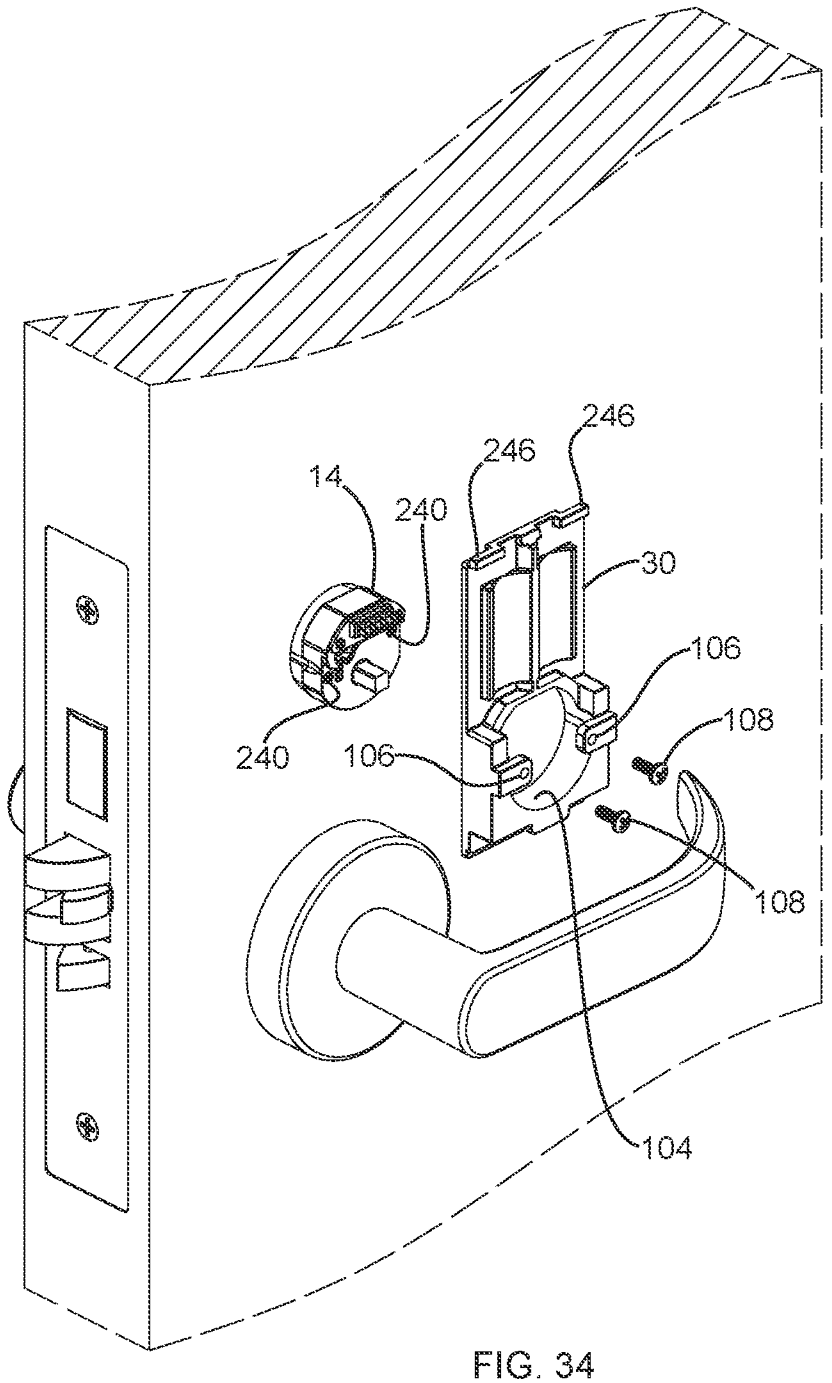
FIGS. 34 and 35 are perspective views depicting the mounting of the back plate to the electronic cylinder assembly.
Figure 35:
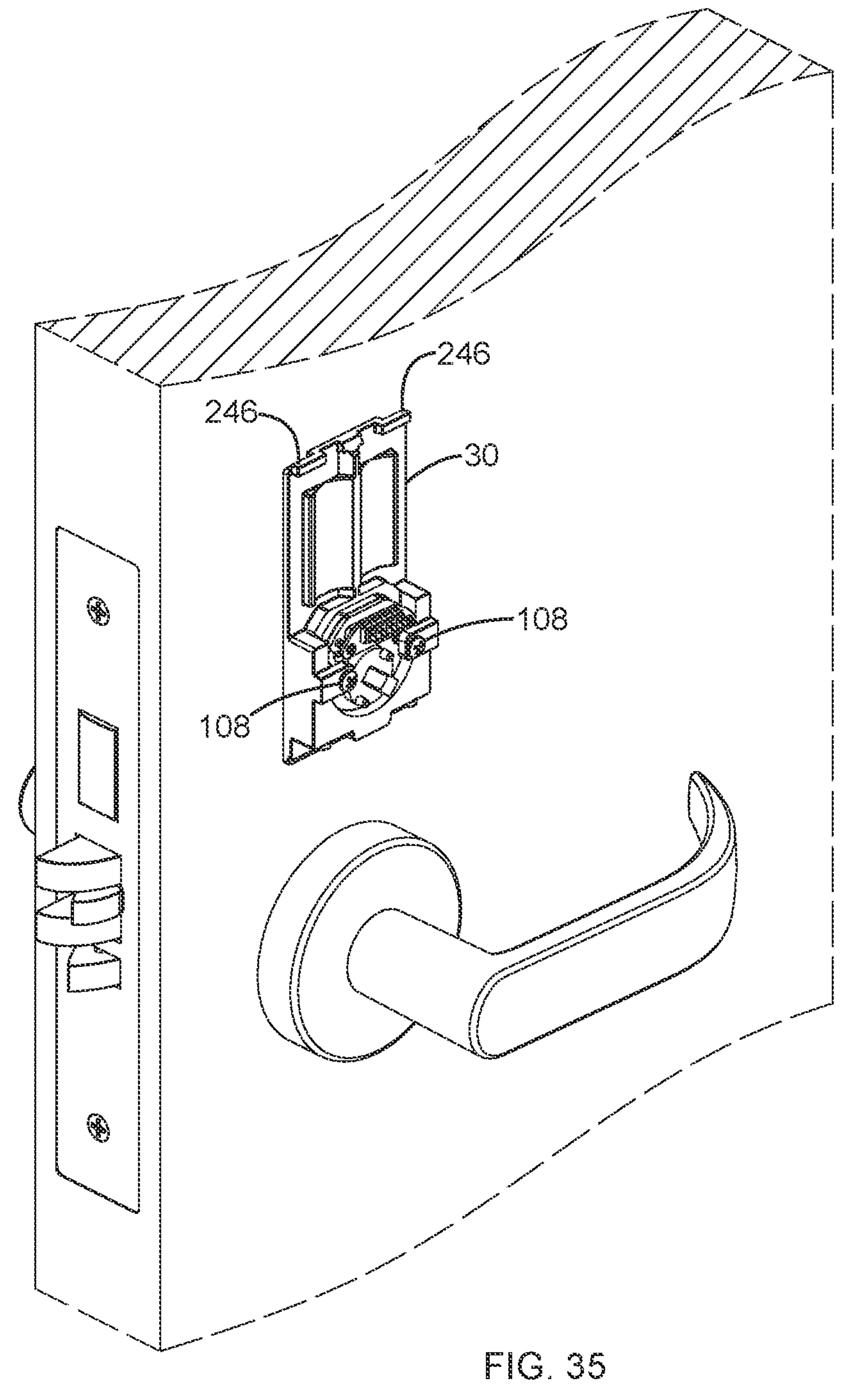

At this point, the back panel 30 of the control housing 16 must be assembled to the cylinder assembly 14. Initially, as shown in FIGS. 32 and 33, the two locating screws 94 are screwed into the backplate 30. Referring now to FIGS. 34 and 35, the backplate 30 is then affixed to the cylinder assembly 14 by placing the back plate opening 104 over the cylinder assembly 14, then screwing in the screws 108 through the through holes 106 of the back plate 30 and into threaded holes 240 on the front surface of the cylinder assembly 14 (threaded holes 240 are not shown in previous views for clarity).

Figure 36:
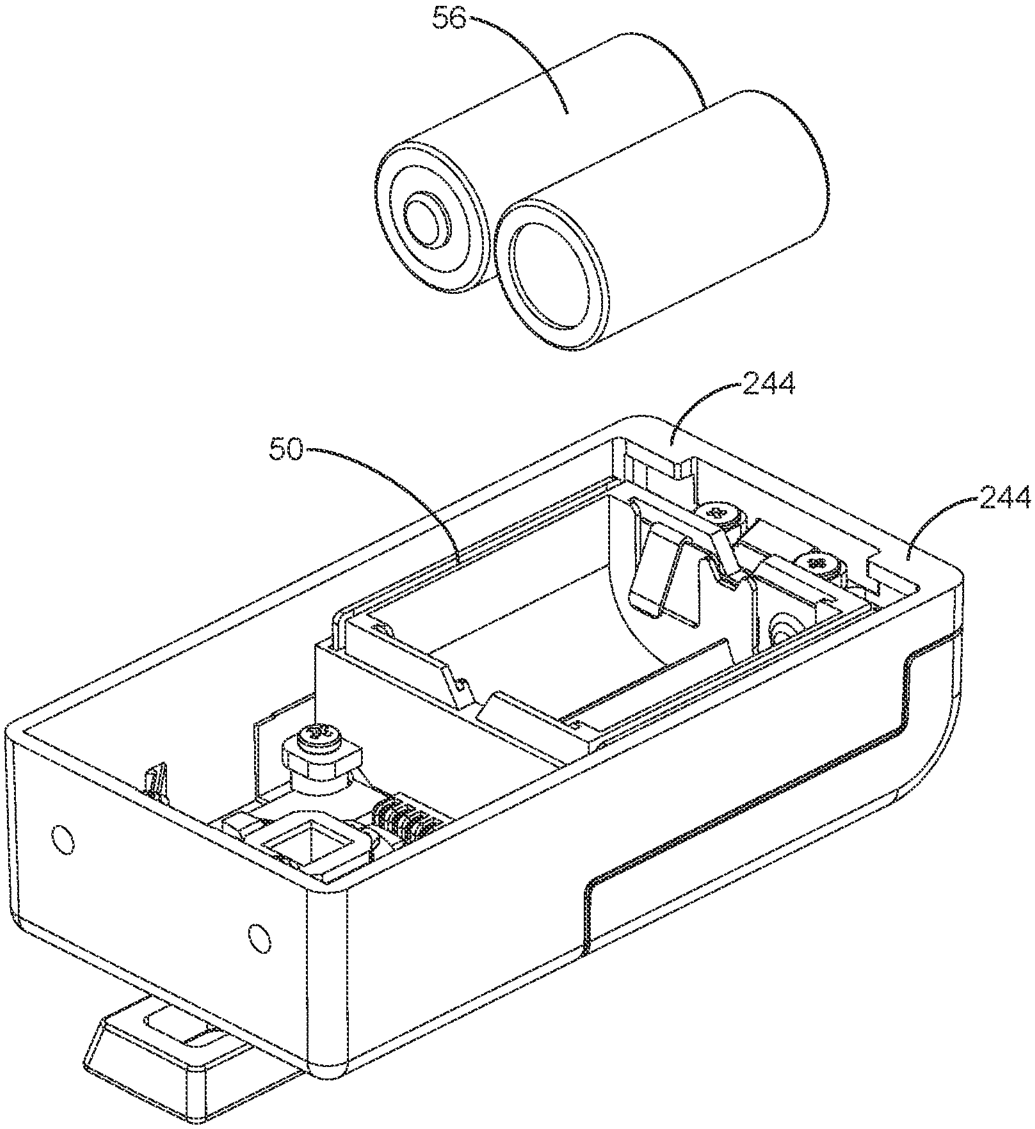
FIGS. 36 and 37 are perspective views of the control assembly of FIG. 4, depicting steps in the insertion of batteries into the control housing.
Figure 37:
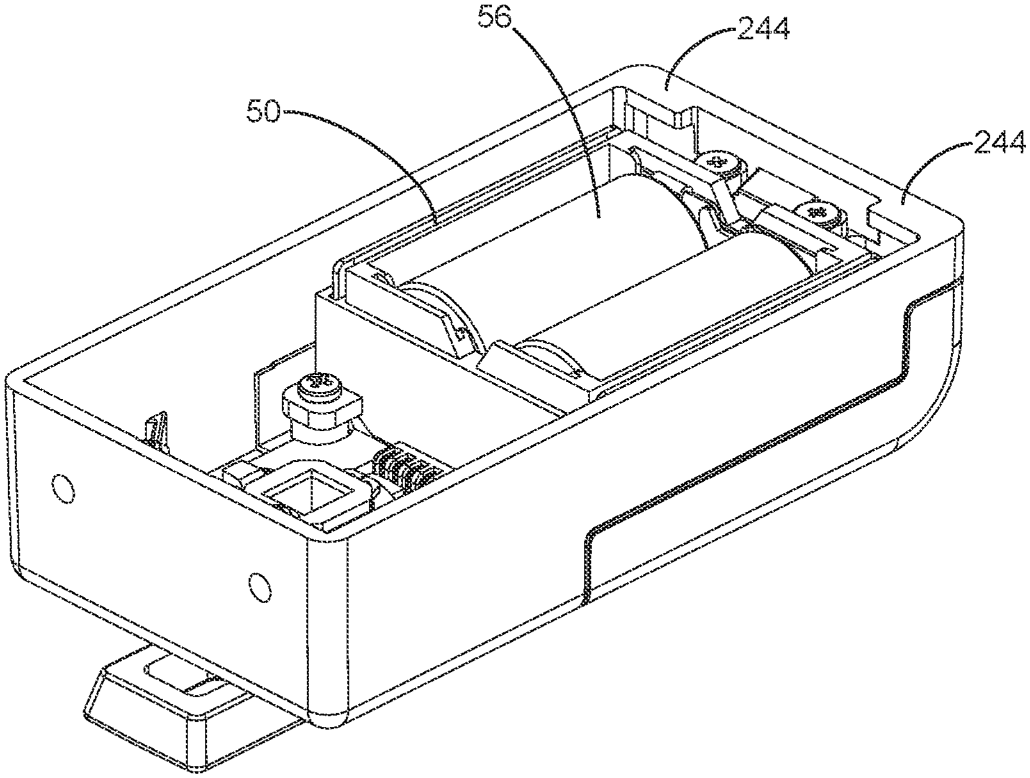
Figure 38:
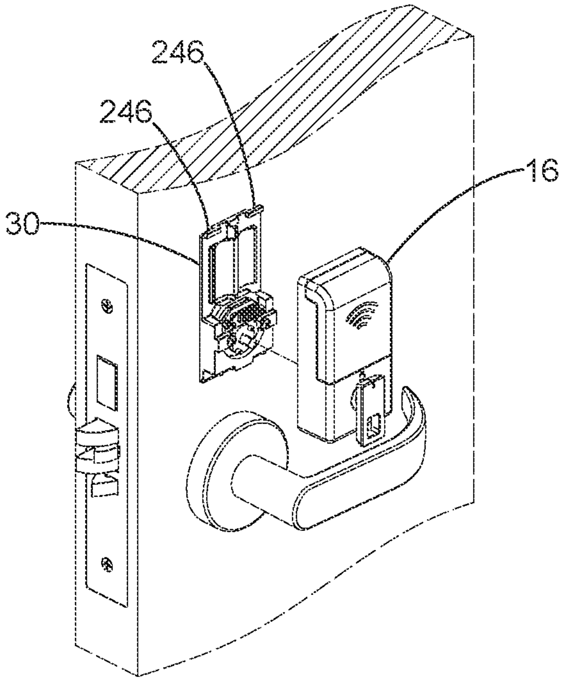
FIGS. 38 and 39 are perspective views of the locating of the control housing of FIG. 4 to the back plate of FIG. 32.
Figure 39:
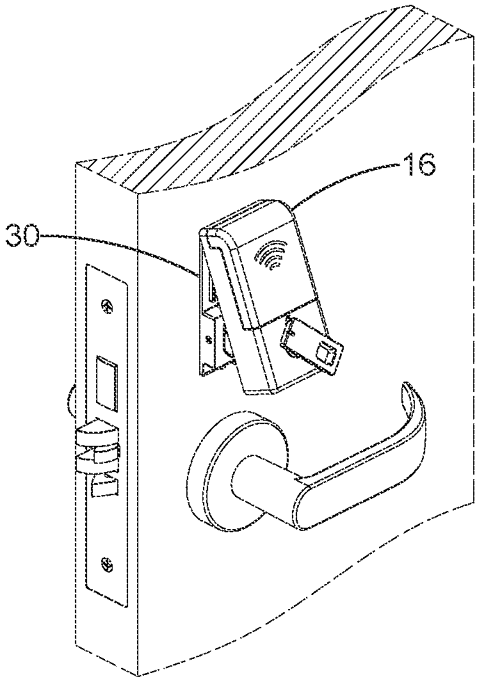

Referring now to FIGS. 36 and 37, batteries 56 are inserted into the battery housing 50 to power the lock assembly 10. The control housing 16 includes a pair of locking tabs 244 on a top edge. As seen best in FIGS. 34 and 35, the back plate 30 includes a pair of corresponding receiving tabs 246. Referring now to FIGS. 38 and 39, the control housing 16 may be located on the back plate 30 by placing the locking tabs 244 over the receiving tabs 246. As the control housing 16 is mounted to the back plate 30, the driven shaft 134 of the cylinder assembly 14 is inserted into the recess 66 in the drive shaft 64 of the knob 20.

Figure 40:
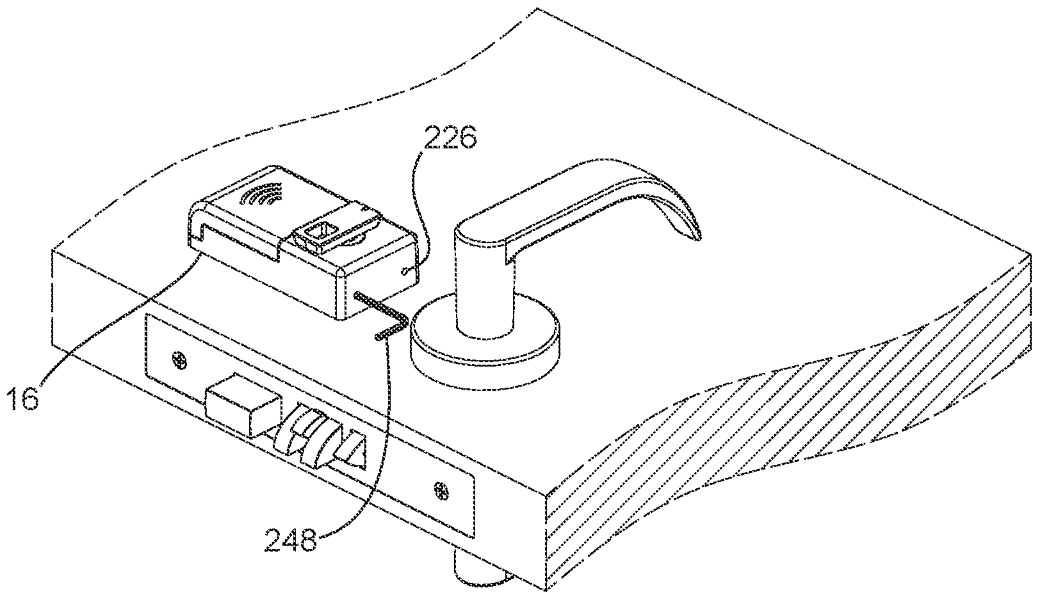
FIGS. 40-42 depict the extension of screws of the back plate downwardly into recesses in the control housing to affix the control housing to the back plate.
Figure 41:
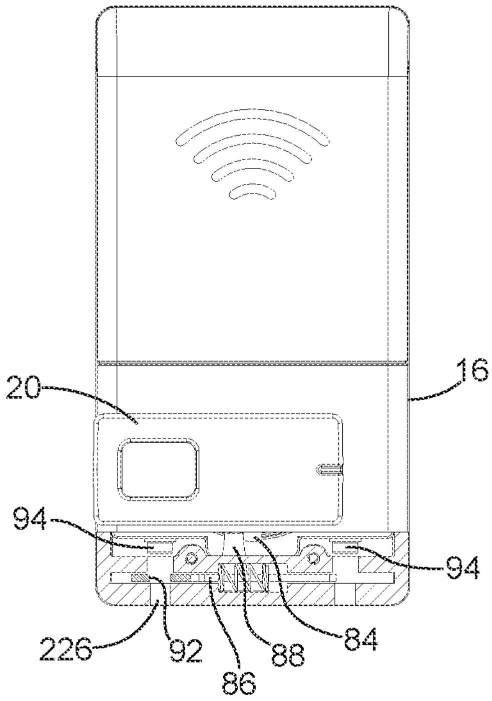
Figure 42:
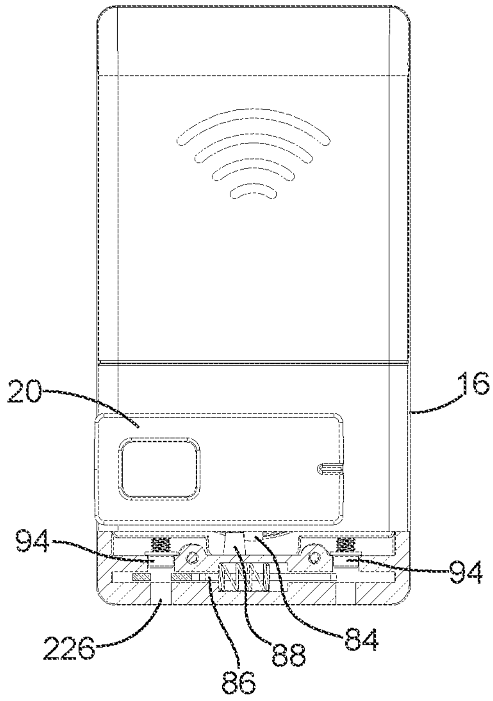

In the next step, the control housing 16 is affixed to the back panel 30. Referring now to FIGS. 40-42, the user rotates the knob 20 to the unlatched door position. As previously discussed with reference to FIG. 19, the positioning piece 68 within the control housing 16 is rotated by the knob 20 such that a second tab 84 engages the pin 88 on the sliding access plate 86 and pushes it to the left. In the depicted embodiment, the tabs 84 engage the pin 88 after a quarter turn. This aligns the recesses 92 of the sliding access plate 86 with bottom openings 226 in the control housing 16 and the fastening screws 94 of the back plate 30. A user can then insert a tool 248 into the bottom opening 226 and engage the locator screws 94 in the back plate 30. The user then screws the locator screws 94 downwardly, and the heads of the screws 94 then engage the openings 226 in the control housing 16. See FIG. 42, in particular. The force of the heads being screwed into the openings 226 of the control housing 16, in combination with the interaction of the tabs 244, 246, affixes the control housing 16 to the back plate 30.

One of ordinary skill will see that the current design can be implemented for either left hand operation or right hand operation, and the knob 20 may be rotated in the opposite direction, with the sliding plate 86 being forced in the opposite direction by the second tabs 84, and the recesses 92 of the sliding access 86 plate still aligning with the holes 226 in the control housing 16. In other words, because there are two second tabs 84 on opposite sides of the positioning piece 68, either one may be used to translate the sliding access plate 86 depending on the direction of rotation of the knob 20.

To install the cylinder assembly 14, the first cam 26 and the second cam 28 must be both in a generally upright position and inside the circumference of the cylinder 110. If this were not the case, the first and second cams 26, 28 would make it impossible to insert the cylinder 110 in the mortise lock 216. However, this orientation of the cams 26, 28 is not the required orientation for operation. Accordingly, upon installation of the cylinder 110 into the mortise lock 16, the user must reorient the cams 26, 28.

Figure 43:
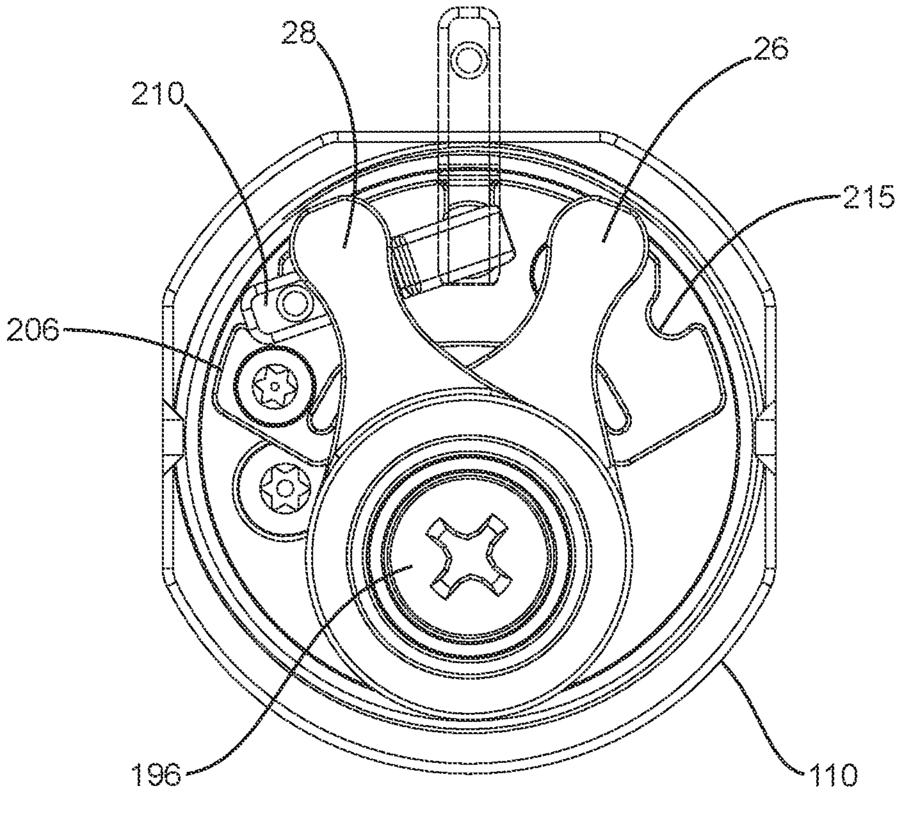
FIG. 43 is an elevation view of the rear side of the cylinder assembly with the first and second cams in the installation position.

Referring now to FIGS. 43-50, the reorientation of the cams 26, 28 after the cylinder 110 is installed in the mortise lock 216 is shown. As shown in FIG. 43, the cams 26, 28 are oriented in the installation position and generally upward with a small angle between the two. Note that the arm 210 can be pivoted, such that the arm 210 can be located as shown in FIG. 43 for right-hand operation, and can be pivoted such that the nub 213 (shown in FIG. 6) can be placed in the positioning recess 215 for left-hand operation.

Figure 44:
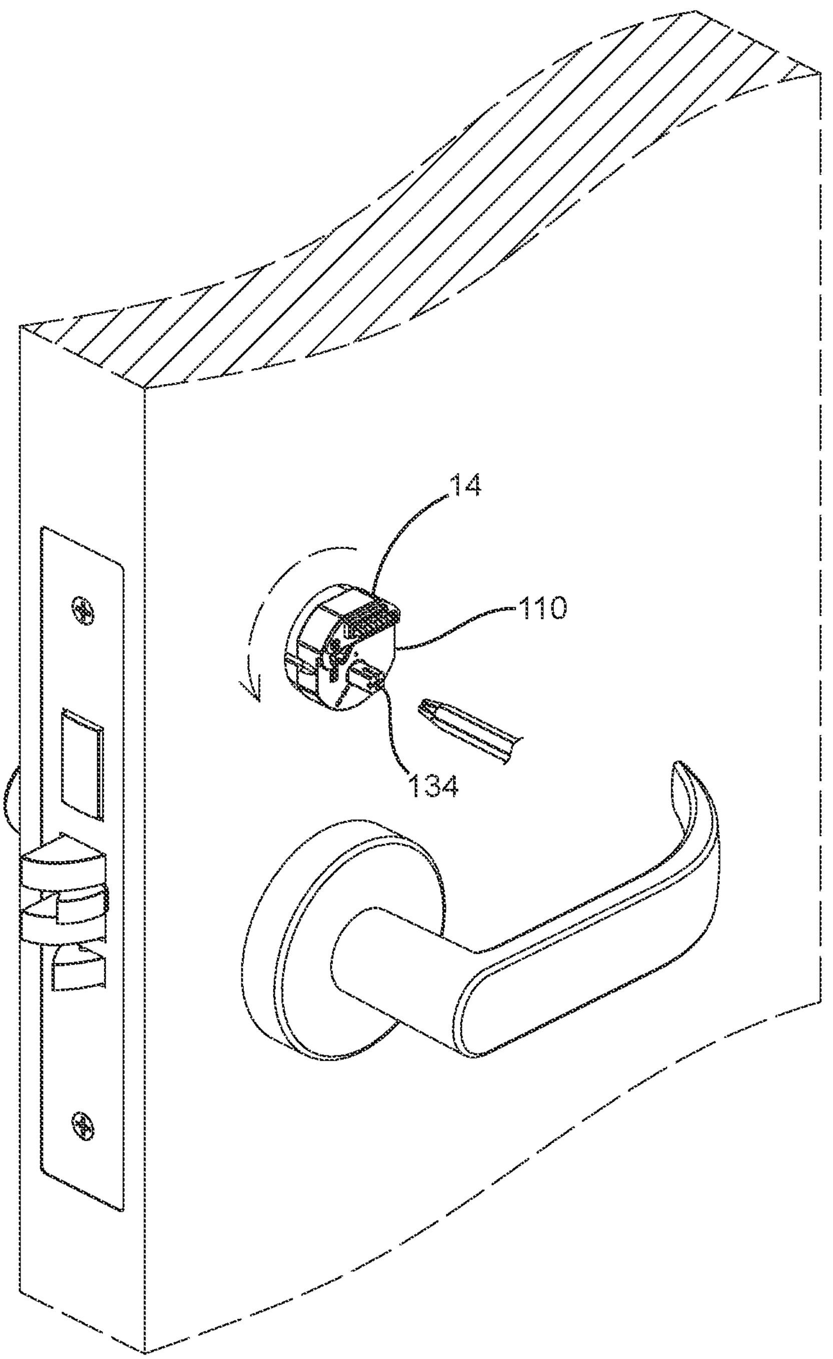
FIG. 44 is a perspective view of the door and the mortise lock showing the required rotation of a driven shaft of the cylinder assembly after installation.
Figure 45:
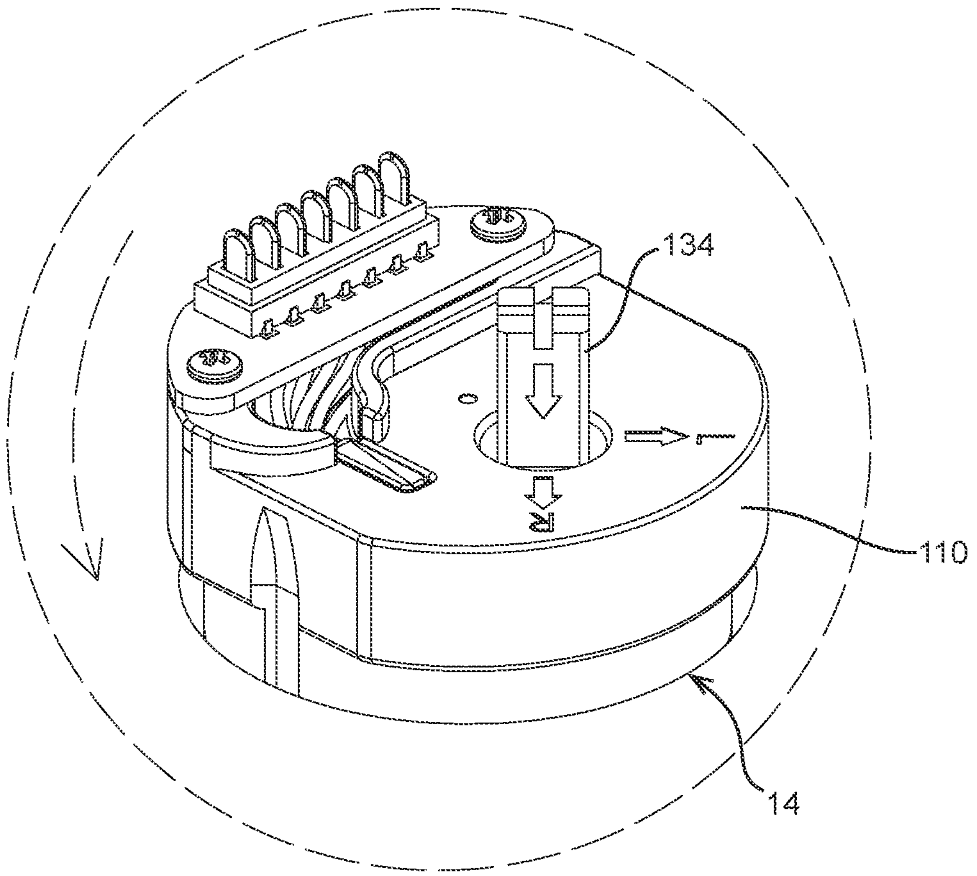
FIG. 45 is a detail perspective view of the cylinder assembly showing the rotation of the driven shaft as in FIG. 44.
Figure 46:
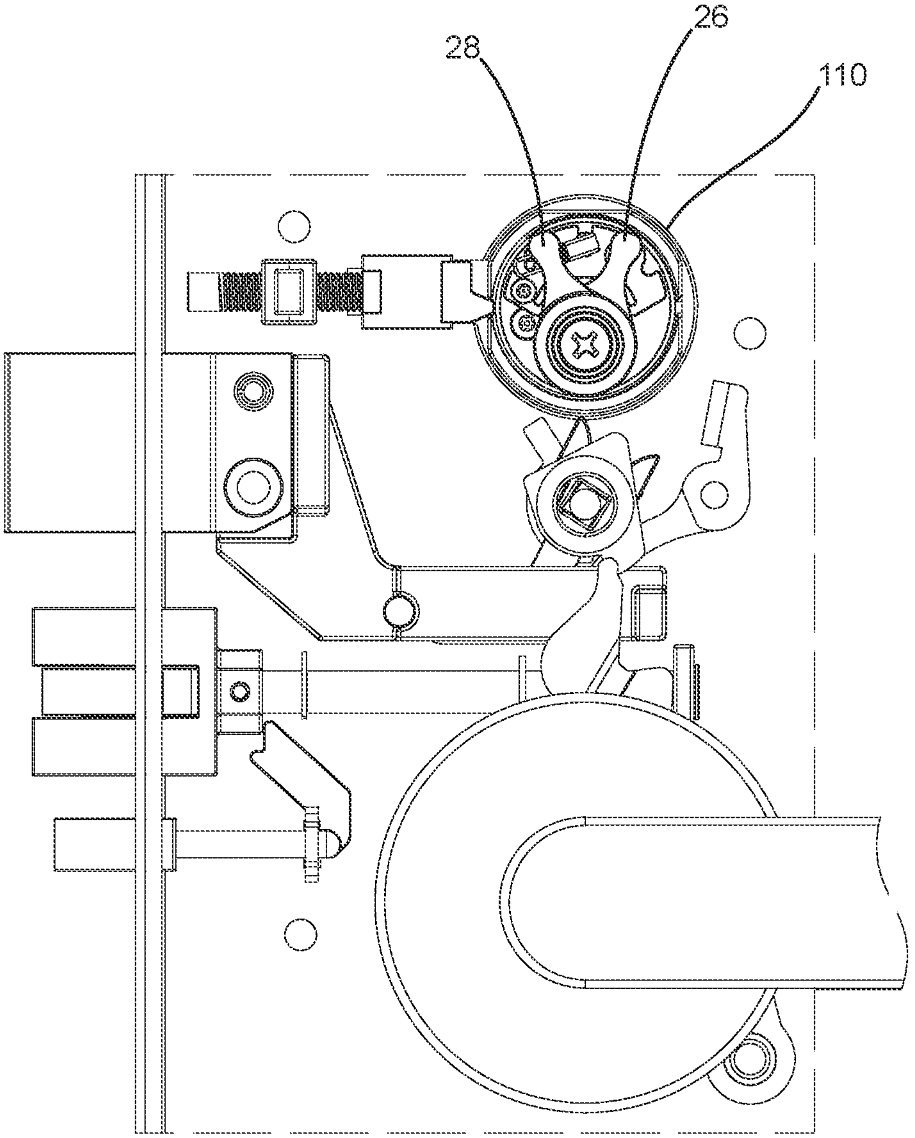
FIG. 46 is a rear elevation view of the mortise door lock with the cams in the installation position
Figure 47:
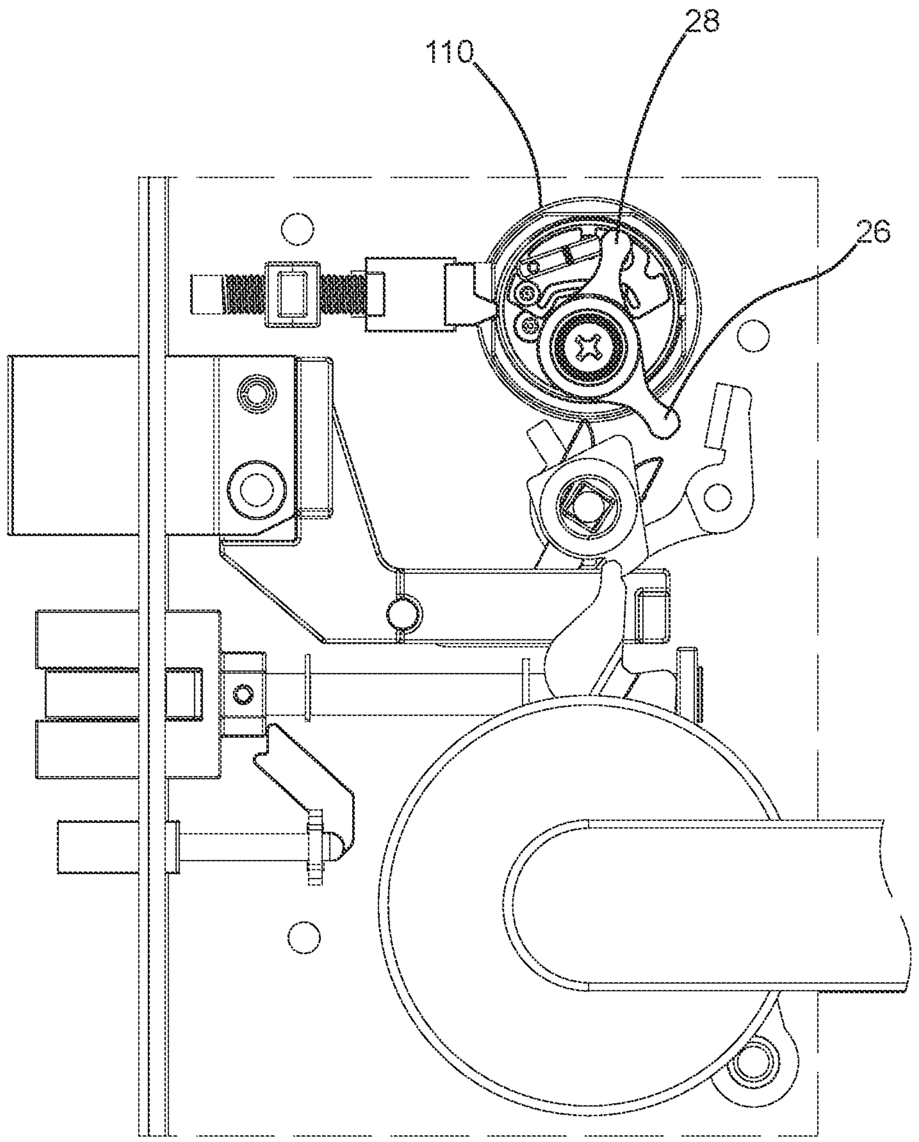
FIG. 47 is a rear elevation view of the mortise door lock with the cams in the locked cylinder position.

Once the cylinder 110 is installed, the user can rotate the driven shaft 134 as shown in FIGS. 44 and 45 from the original position “o” to either the “R” or “L” position as needed, depending on the orientation of the door. In FIGS. 44 and 45, the driven shaft 134 is rotated counterclockwise for right-handed operation. Referring now to FIGS. 46 and 47, the rotation of the driven shaft 34 in the counterclockwise direction rotates the first and second cams in a clockwise direction (as they are viewed on opposite sides of the door). As the user rotates the driven shaft 134, the driven shaft 134 rotates the first cam 26 into the proper position such that the orientation between it and the second cam 28 is correct. The first cam 26 then begins to drag the second cam 28, and the rotation of the driven shaft 134 by the user rotates both at the same time to the position shown in FIG. 47, which is the locked cylinder, bolted door position discussed above. Of course, in the alternative embodiments of FIGS. 2*a* and 2*b*, depicting the rim cylinder with the tailpiece 266 and the single cam 270, respectively, the orientation of the cams 26 and 28 relative to each other is not needed.

Figure 48:
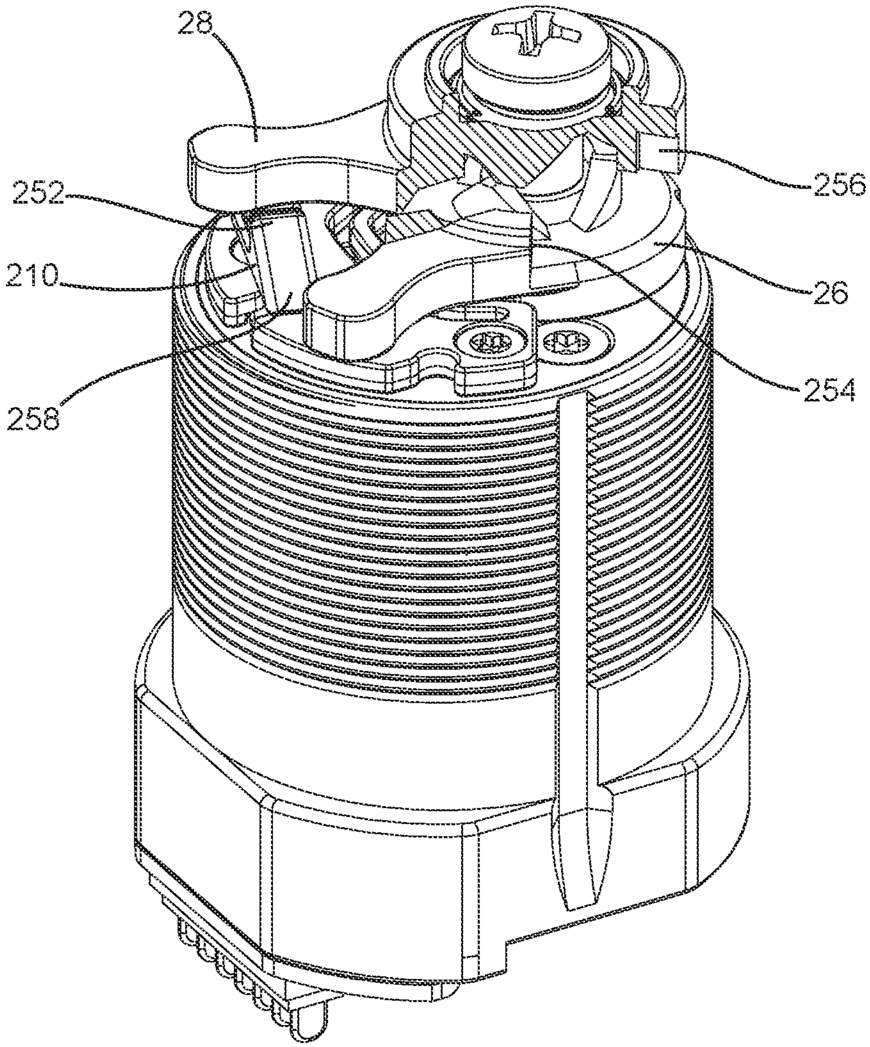
FIG. 48 is a perspective partial cutaway view of the cylinder assembly with the cams in the installation position.
Figure 49:
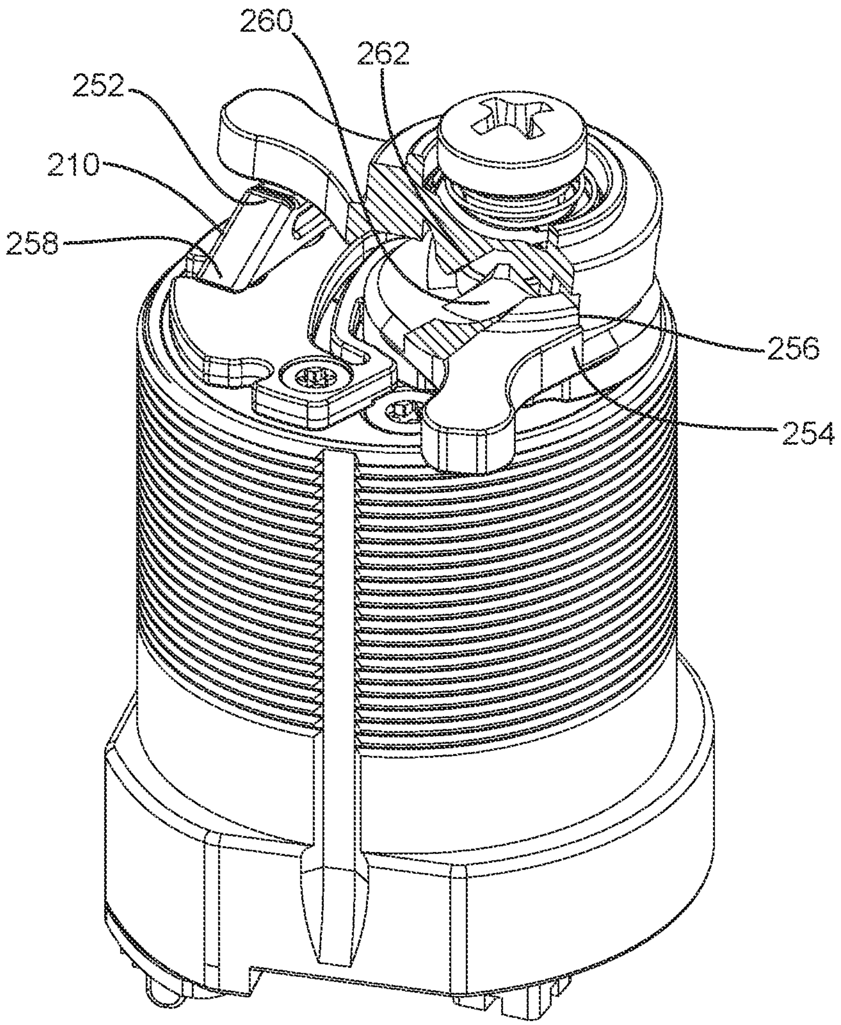
FIG. 49 is a perspective partial cutaway view of the cylinder assembly with the cams in an intermediate position.
Figure 50:
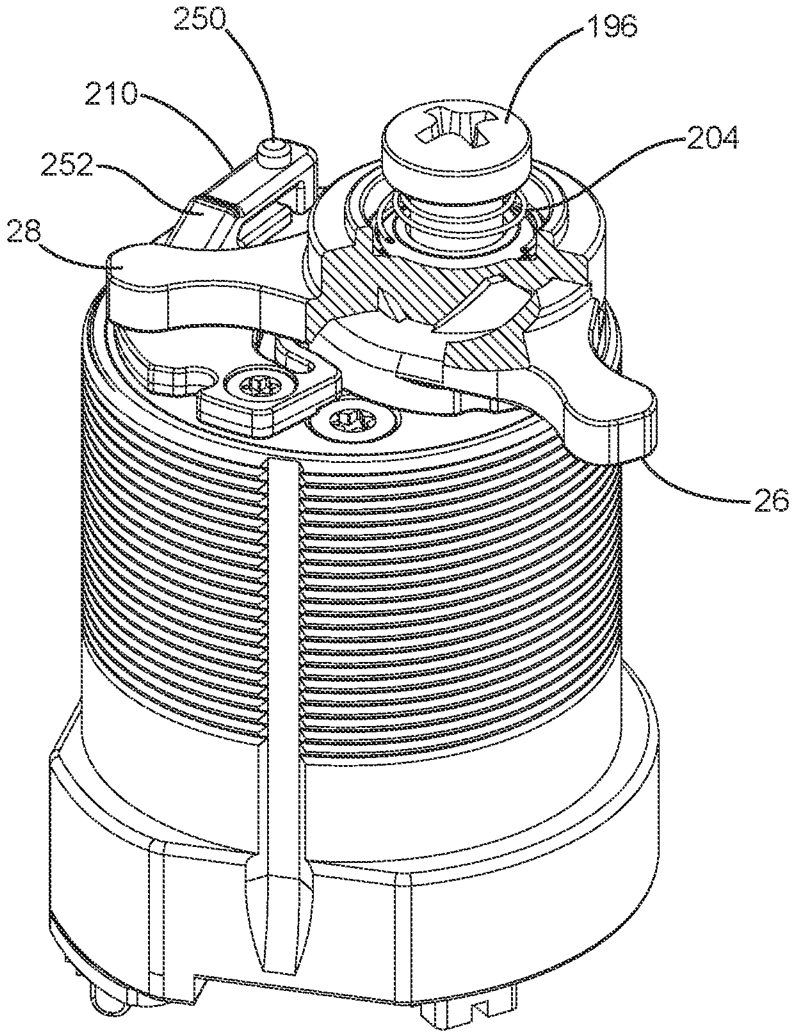
FIG. 50 is a perspective partial cutaway view of the cylinder assembly with the cams in the locked cylinder position.

FIGS. 48 to 50 provide further detail. In the installation position shown in FIG. 48, the second cam 28 sits on top of the arm 210 in between a blocker 250 and a ridge 252. As shown in FIG. 49, the first cam 26 rotates relative to the second cam 28 as described above until a blocker 254 of the first cam 26 contacts a face 256 of the second cam 28. As the first cam 26 rotates, it pushes the second cam 28, which then rotates over the ridge 252 and down a ramp 258 of the arm 210. The first cam 26 includes a series of upstanding V-locators 260, and the second cam 28 includes corresponding receivers 262. As the second cam 28 descends the ramp 258, the receivers 262 of the second cam 28 descend on top of the V-locators 260 to precisely and repeatably locate the second cam 28 on top of the first cam 26 as shown on FIG. 50, The force of the spring 204, combined with the friction between the V-locators 260 and the receivers 262, keeps the second cam 28 against the first cam 26.

Again, the arm 210 can be pivoted within the bracket 206 to accommodate left hand or right hand operation. Moreover, the cams 26, 28 can be manually reset such that the second cam 28 sits on the arm 210 to the left of the first cam 26 in the installation position. The user simply needs to lift the second cam 28 away from the first cam 26 and against the force of the spring 204, re-orient it, then drop it back down. Thus, to switch between left hand and right hand operation, the user simply needs to pivot the arm 210 from one side to the other, and reset the second cam 28 on top of the first cam 26 prior to installation. The user can then rotate the driven shaft from "o" to "L".

In use, the user can provide a credential to the control housing 16. The credential may be provided in numerous ways, including without limitation a wireless credential such as RFID, Bluetooth, Bluetooth LE, or NFC, a biometric credential, an input to a keypad (see FIG. 51), or an input from a remote terminal via the internet. The credential is delivered to the processor on the circuit board 122, which then determines if the credential is approved. If the credential is approved, the processor then signals the motor 154, and the motor 154 draws the slider 160 and the clutch 154 such that the clutch fingers 144 engage the recesses 174 in the cam driver 168. At this point the knob 20 is operatively connected to the cam driver 168, and the user may rotate the knob 20, which will then rotate the first cam 26 and second cam 28. The cams 26, 28 may be used to sequentially retract the deadbolt 218 and the latch 220, respectively, with less than a full turn of the knob 20.

In the current embodiment, the clutch 132 remains engaged with the cam driver 168 for an indeterminant amount of time. Only when the user enters the credential again does the clutch 132 withdraw from and disengage from the cam driver 168, thereby locking the lock cylinder assembly 10. In other embodiments, however, the clutch 132 may remain engaged with the cam driver 168 for only a predetermined amount of time, thereby automatically re-locking the lock cylinder assembly 10.

In the current embodiment, when the lock cylinder assembly 10 is "locked," the clutch 132 is disengaged from the cam driver 168, and the knob 20 is freely rotatable without causing any corresponding rotation of the cam driver 168. Thus the notch 24 does not always point directly at the locked indicator 22 in the locked state, i.e., when a user is prevented from retracting the bolt and/or the latch, thereby allowing him or her to open the door. An indicator 24 with an LED, thus, can provide immediate visual feedback to the user However, once the credential is entered, the user rotates the knob Internet and Bluetooth connectivity can provide further advantages and functionality. The lock cylinder assembly 10 may be connected via the internet to a remote cloud-based server, which can be accessed by any personal computing device in the world, such as a personal computer, tablet, or mobile device. Likewise, the lock cylinder assembly 10 may be connected wirelessly to a personal computing device via Bluetooth (or NFC, etc.). The user can then access and/or control the lock cylinder assembly 10 remotely to program use requirements and restrictions, download an audit trail, check the battery level, lock or unlock the lock, upgrade or update the firmware, and the like. The lock cylinder assembly 10 may require two-factor authentication such that a code is sent to the user's mobile device via text or email.

The determination of whether proper credentials are submitted can take place either in the lock cylinder assembly 10 itself, or at a remote terminal. In other words, for remote analysis, the lock cylinder assembly 10 receives the credential, then transfers the credential via the wireless internet to a server that remotely stores all information necessary to determine if the credential meets the criteria for lock operation. In other embodiments, the lock cylinder assembly 10 goes into sleep mode to save the life of the batteries 56. The user wakes the lock cylinder assembly 10 up via the proximity to the capacitive sensor 44. Other applications of the lock cylinder assembly 10 described herein will be within the scope and spirit of this disclosure.

We claim:

1. A method of installing an electronic cylinder, comprising:

providing a core, a first shaft rotatably mounted in the core, a second shaft rotatably mounted in the core and coaxial with the first shaft, a clutch disposed on the first shaft and rotationally fixed to the first shaft but axially shiftable, a motor configured to shift the clutch axially between a first position and a second position, wherein in first position, the clutch is disengaged from the second shaft, wherein in the second position, the clutch is engaged with the second shaft, such that rotation of the first shaft causes rotation of the second shaft;

inserting the core in a lock body of a mortise lock, the lock body disposed at least partially within a door;

affixing the core to the lock body;

disposing a back panel on the core and exterior to the door, the back panel including an opening sized and shaped to receive the core;

disposing a housing on the back panel, the housing including electronics configured to receive an electronic credential; and fastening the housing to the back panel.

2. The method of claim 1, the core further including a core connector disposed on a front face of the core, the housing including a housing connector, the disposing step further including the step of inserting the core connector into the housing connector.

3. The method of claim 1, the core further including a first and second cam disposed within the circumference of the core; the method further including rotating the first shaft to reorient the angular position of the first cam and the second cam relative to the core.

4. The method of claim 3, the step of rotating the first shaft further includes reorienting the first cam relative to the second cam.

5. The method of claim 1, further including a cam or tailpiece disposed within the circumference of the core, the method further including rotating the first shaft to reorient the angular position of the cam or tailpiece.

6. A method of installing an electronic cylinder, comprising:

providing a core, a first shaft rotatably mounted in the core, a second shaft rotatably mounted in the core and coaxial with the first shaft, a clutch disposed on the first shaft and rotationally fixed to the first shaft but axially shiftable, a motor configured to shift the clutch axially between a first position and a second position, wherein in first position, the clutch is disengaged from the second shaft, wherein in the second position, the clutch is engaged with the second shaft, such that rotation of the first shaft causes rotation of the second shaft;

inserting the core in a lock body of a mortise lock, the lock body disposed at least partially within a door;

affixing the core to the lock body;

disposing a housing on the core, the housing including electronics configured to receive an electronic credential;

rotating a knob located on the housing to expose at least one fastener within the housing, the housing further including a positioning piece, the rotating of the knob causing the rotation of the positioning piece; and fastening the housing to the core.

7. The method of claim 6, the housing further including a sliding access plate, wherein the rotation of the positioning piece causes a shift in the sliding access plate to expose the at least one fastener.

8. An assembly for an electronically operated lock cylinder, comprising:

a cylinder;

a first shaft at least partially disposed within the cylinder and rotatable relative to the cylinder;

a second shaft at least partially disposed within the cylinder and rotatable relative to the cylinder, the second shaft coaxial with the first shaft;

a clutch disposed on the first shaft and rotationally fixed to the first shaft but axially shiftable;

a motor configured to shift the clutch axially between a first position and a second position, wherein in first position, the clutch is disengaged from the second shaft, wherein in the second position, the clutch is engaged with the second shaft, such that rotation of the first shaft causes rotation of the second shaft;

a slider operatively coupled to the motor and including a slider finger, the slider finger being engaged with the clutch; and an electrical connector disposed on a front face of the cylinder, the electrical connector configured to receive data concerning access credentials.

9. The assembly of claim 8, further comprising a control housing mountable to the cylinder, the housing including an input for receiving an electronic credential and a housing connector for connecting to the electrical connector of the cylinder, the input in communication with the housing connector.

10. The assembly of claim 9, the input including one or more wireless antennas.

11. The assembly of claim 10, wherein the one or more wireless antennas includes at least one of an RFID, Bluetooth, Bluetooth LE, NFC, and Mobile ID antenna.

12. The assembly of claim 9, the input including a keypad.

13. The assembly of claim 9, the control housing including an antenna configured to operatively couple the assembly to the internet.

14. The assembly of claim 8 further comprising a first cam and a second cam, the first cam being rotationally adjustable relative to the second cam.

15. The assembly of claim 8, further comprising one of a cam and a tailpiece.

16. The assembly of claim 8, further comprising a worm gear operatively connected to the motor and a spring disposed on the worm gear and within the slider.

17. The assembly of claim 8, the clutch further including at least one clutch finger, the second shaft further including at least one finger recess, wherein in the second position the at least one clutch finger is disposed within the at least one finger recess.

18. The assembly of claim 8, further comprising:

a first locator disposed on the first shaft; and a second locator disposed on the second shaft; wherein the first and second locators are configured to assist the alignment of the first shaft with the second shaft to permit the clutch to engage the second shaft.

19. An assembly for an electronically operated lock cylinder, comprising:

a cylinder;

a first shaft at least partially disposed within the cylinder and rotatable relative to the cylinder;

a second shaft at least partially disposed within the cylinder and rotatable relative to the cylinder, the second shaft coaxial with the first shaft;

a clutch disposed on the first shaft and rotationally fixed to the first shaft but axially shiftable;

a motor configured to shift the clutch axially between a first position and a second position, wherein in first position, the clutch is disengaged from the second shaft, wherein in the second position, the clutch is engaged with the second shaft, such that rotation of the first shaft causes rotation of the second shaft;

an electrical connector disposed on a front face of the cylinder, the electrical connector configured to receive data concerning access credentials; and a first sensor and a second sensor, each disposed adjacent the second shaft; the second shaft further comprising a reflecting ring and a shielding ring configured to interact with the first sensor and second sensor to signal the rotational position of the second shaft.

20. The assembly of claim 18, wherein the first and second locators are first and second magnets.

21. An electronic lock for a door, the lock comprising:

a cylinder having an external diameter and configured for inserting into a mechanical mortise lock;

a shaft at least partially disposed within the cylinder and rotatable relative to the cylinder, the shaft having a diameter less than the external diameter of the cylinder;

a back plate mountable to the cylinder, the back plate including an opening sized and shaped to receive the external diameter of the cylinder and for the cylinder to extend therethrough; and a control housing mountable to the back plate, the control housing configured to receive an electronic credential, the control housing in electronic communication with the cylinder, the control housing further including a knob;

wherein the back plate includes at least one mounting hole for fastening the back plate to the cylinder, the back plate further including a connector for mounting the control housing to the back plate; and wherein the cylinder is configured to operatively couple the knob to the shaft upon receipt of a predetermined electronic credential.

22. An assembly for an electronically operated lock cylinder, comprising:

a cylinder;

a first shaft rotatably mounted in the cylinder;

a second shaft rotatably mounted in the cylinder and coaxial with the first shaft;

a clutch disposed on the first shaft and rotationally fixed to the first shaft but axially shiftable;

a motor configured to shift the clutch axially between a first position and a second position, wherein in first position, the clutch is disengaged from the second shaft, wherein in the second position, the clutch is engaged with the second shaft, such that rotation of the first shaft causes rotation of the second shaft;

a slider operatively coupled to the motor and including a slider finger, the slider finger operatively coupled to the clutch; and the cylinder being externally threaded and configured for insertion into a mortise lock.

23. The assembly of claim 22, the motor being configured to translate the slider axially, the slider configured to translate the clutch axially.

* * * * *